US012687640B2

(12) United States Patent
Matsuzaki

(10) Patent No.: US 12,687,640 B2
(45) Date of Patent: Jul. 21, 2026

(54) AGRICULTURAL MACHINE, SENSING SYSTEM USED IN AGRICULTURAL MACHINE, AND SENSING METHOD UTILIZING TECHNIQUES TO SEARCH ENVIRONMENT AROUND AGRICULTURAL MACHINE

(71) Applicant: Kubota Corporation, Osaka (JP)

(72) Inventor: Yushi Matsuzaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 75 days.

(21) Appl. No.: 18/749,601

(22) Filed: Jun. 20, 2024

(65) Prior Publication Data

US 2024/0345253 A1     Oct. 17, 2024

Related U.S. Application Data

(63) Continuation of application No. PCT/JP2022/046459, filed on Dec. 16, 2022.

(30) Foreign Application Priority Data

Dec. 27, 2021     (JP) ................................. 2021-212577

(51) Int. Cl.
G01S 17/931        (2020.01)
A01B 69/04         (2006.01)
G01S 7/481         (2006.01)
G01S 17/89         (2020.01)

(52) U.S. Cl.
CPC .......... G01S 17/931 (2020.01); A01B 69/008 (2013.01); G01S 7/4817 (2013.01); G01S 17/89 (2013.01)

(58) Field of Classification Search
CPC ...... G01S 17/931; G01S 7/4817; G01S 17/89; A01B 69/008
See application file for complete search history.

(56) References Cited

U.S. PATENT DOCUMENTS 6,389,785 B1 *   5/2002  Diekhans ............. A01B 69/008
                                                            172/4.5
7,155,888 B2 *   1/2007  Diekhans ............. A01D 43/073
                                                            56/10.2 R (Continued)

FOREIGN PATENT DOCUMENTS

JP      2015-191592 A     11/2015
JP      2017-015409 A      1/2017
(Continued)

OTHER PUBLICATIONS

Official Communication issued in International Patent Application No. PCT/JP2022/046459, mailed on Jan. 31, 2023.

*Primary Examiner* — Ramsey Refai
(74) *Attorney, Agent, or Firm* — Keating & Bennett, LLP

(57)        ABSTRACT

A sensing system for a mobile agricultural machine includes one or more sensors to sense an environment around the agricultural machine to output sensing data, and a processor configured or programmed to detect an object in a search region around the agricultural machine based on the sensing data and to change a pattern of the search region for the detection of the object in accordance with an area in which the agricultural machine is located.

17 Claims, 27 Drawing Sheets

(56)                   References Cited

U.S. PATENT DOCUMENTS

| | | | | |
|---|---|---|---|---|
| 7,499,775 | B2 * | 3/2009 | Filippov | G05D 1/027 |
| | | | | 701/28 |
| 9,719,801 | B1 * | 8/2017 | Ferguson | G01C 21/3602 |
| 10,640,033 | B1 * | 5/2020 | Gandhi | B60Q 1/122 |
| 11,122,740 | B2 * | 9/2021 | Middelberg | A01D 41/1278 |
| 11,991,946 | B2 * | 5/2024 | Yaroshenko | A01B 79/005 |
| 12,329,065 | B2 * | 6/2025 | Vandike | G05D 1/0278 |
| 12,409,772 | B2 * | 9/2025 | Iudica | G06V 20/56 |
| 2003/0145571 | A1 * | 8/2003 | Diekhans | A01D 41/1278 |
| | | | | 56/10.2 R |
| 2006/0089764 | A1 * | 4/2006 | Filippov | G05D 1/027 |
| | | | | 701/2 |
| 2010/0063648 | A1 * | 3/2010 | Anderson | G05D 1/0088 |
| | | | | 701/1 |
| 2014/0015666 | A1 * | 1/2014 | Rohr | G01S 13/931 |
| | | | | 340/479 |
| 2016/0175869 | A1 * | 6/2016 | Sullivan | A01M 7/0042 |
| | | | | 239/11 |

| | | | | |
|---|---|---|---|---|
| 2017/0131722 | A1 | 5/2017 | Hiramatsu et al. | |
| 2017/0328729 | A1 * | 11/2017 | Zhu | G05D 1/0238 |
| 2018/0206392 | A1 | 7/2018 | Matsuzaki | |
| 2019/0037194 | A1 * | 1/2019 | Schmidt | H04N 23/6812 |
| 2020/0255030 | A1 | 8/2020 | Yamamoto et al. | |
| 2021/0086687 | A1 * | 3/2021 | Iudica | B60Q 1/085 |
| 2022/0083067 | A1 * | 3/2022 | Yoshida | G05D 1/0094 |
| 2022/0201923 | A1 | 6/2022 | Adachi | |
| 2022/0390568 | A1 | 12/2022 | Kubota et al. | |

FOREIGN PATENT DOCUMENTS

| | | | |
|---|---|---|---|
| JP | 2018-113937 | A | 7/2018 |
| JP | 2019-175059 | A | 10/2019 |
| JP | 2021036772 | A | 3/2021 |
| JP | 2021-108621 | A | 8/2021 |
| WO | 2019/082926 | A1 | 5/2019 |
| WO | 2020/240983 | A1 | 12/2020 |
| WO | 2021/079911 | A1 | 4/2021 |

* cited by examiner

AGRICULTURAL MACHINE, SENSING SYSTEM USED IN AGRICULTURAL MACHINE, AND SENSING METHOD UTILIZING TECHNIQUES TO SEARCH ENVIRONMENT AROUND AGRICULTURAL MACHINE

CROSS REFERENCE TO RELATED APPLICATIONS

This application claims the benefit of priority to Japanese Patent Application No. 2021-212577 filed on Dec. 27, 2021 and is a Continuation Application of PCT Application No. PCT/JP2022/046459 filed on Dec. 16, 2022. The entire contents of each application are hereby incorporated herein by reference.

BACKGROUND OF THE INVENTION

1. Field of the Invention

The present disclosure relates to agricultural machines and to sensing systems and sensing methods for agricultural machines.

2. Description of the Related Art

Research and development is underway to study smart agriculture with the effective use of ICT (Information and Communication Technology) and IoT (Internet of Things) as the next generation of agriculture. Research and development is also underway to study automated and unmanned work vehicles, such as tractors, for use in agricultural fields. For example, work vehicles capable of traveling in an automatic steering mode with the use of a positioning system such as GNSS (Global Navigation Satellite System), which is capable of precise positioning, have been put into practical use.

In addition, research and development is also underway to study the technique of conducting a search of a region around a work vehicle with the use of obstacle sensors to detect obstacles around the work vehicle. For example, Japanese Laid-Open Patent Publication No. 2019-175059 discloses the technique of detecting obstacles around a self-drivable tractor with the use of LiDAR (Light Detection and Ranging) sensors.

SUMMARY OF THE INVENTION

Example embodiments of the present invention provide techniques for a search of an environment around an agricultural machine, which is improved or optimized for the area in which the agricultural machine is located.

A sensing system according to an example embodiment of the present disclosure includes one or more sensors to sense an environment around the agricultural machine to output sensing data, and a processor configured or programmed to detect an object in a search region around the agricultural machine based on the sensing data and change a pattern of the search region for the detection of the object in accordance with an area in which the agricultural machine is located.

A sensing method according to an example embodiment of the present disclosure includes sensing an environment around the agricultural machine using one or more sensors to output sensing data, detecting an object in a search region around the agricultural machine based on the sensing data, and changing a pattern of the search region for the detection of the object in accordance with an area in which the agricultural machine is located.

General or specific aspects of the present disclosure may be implemented using a device, a system, a method, an integrated circuit, a computer program, a non-transitory computer-readable storage medium, or any combination thereof. The computer-readable storage medium may be inclusive of a volatile storage medium or a non-volatile storage medium. The device may include a plurality of devices. In the case where the device includes two or more devices, the two or more devices may be disposed within a single apparatus, or divided over two or more separate apparatuses.

According to example embodiments of the present disclosure, the pattern of search regions for detection of objects is changed in accordance with the area in which an agricultural machine is located. Due to this feature, a search can be conducted which is improved or optimized for the area in which the agricultural machine is located.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
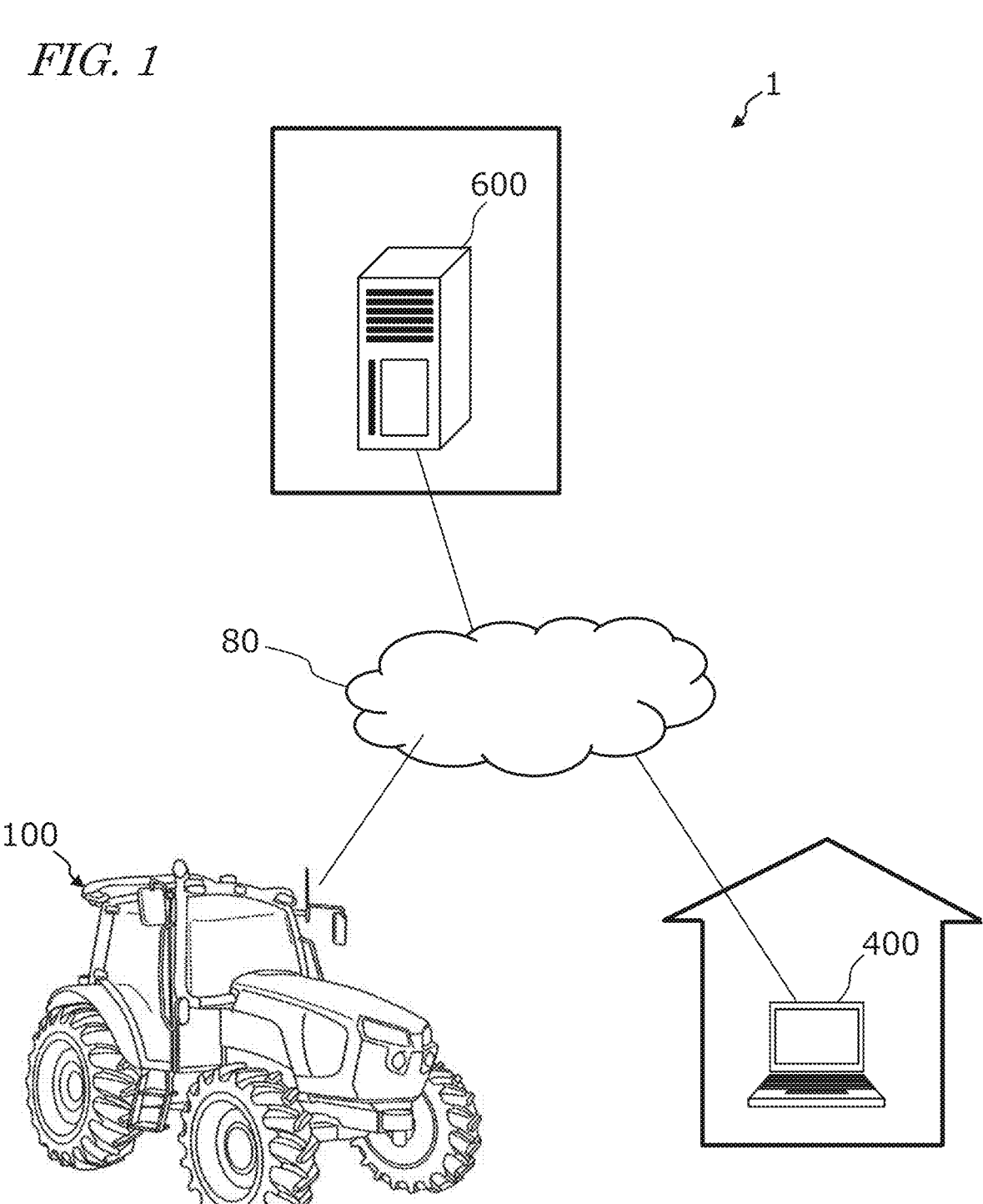
FIG. 1 is a diagram an overview of an agriculture management system according to an illustrative example embodiment of the present disclosure.

In the present disclosure, an "agricultural machine" refers to a machine for agricultural applications. The agricultural machine of the present disclosure can be a mobile agricultural machine that is capable of performing agricultural work while traveling. Examples of agricultural machines include tractors, harvesters, rice transplanters, vehicles for crop management, vegetable transplanters, mowers, seeders, spreaders, and mobile robots for agriculture. Not only may a work vehicle such as a tractor function as an "agricultural machine" alone by itself, but also a combination of a work vehicle and an implement that is attached to, or towed by, the work vehicle may function as an "agricultural machine". For the ground surface inside a field, the agricultural machine performs agricultural work such as tilling, seeding, preventive pest control, manure spreading, planting of crops, or harvesting. Such agricultural work or tasks may be referred to as "groundwork", or simply as "work" or "tasks". Travel of a vehicle-type agricultural machine performed while the agricultural machine also performs agricultural work may be referred to as "tasked travel".

"Self-driving" refers to controlling the movement of an agricultural machine by the action of a controller, rather than through manual operations of a driver. An agricultural machine that performs self-driving may be referred to as a "self-driving agricultural machine" or a "robotic agricultural machine". During self-driving, not only the movement of the agricultural machine, but also the operation of agricultural work (e.g., the operation of the implement) may be controlled automatically. In the case where the agricultural machine is a vehicle-type machine, travel of the agricultural machine via self-driving will be referred to as "self-traveling". The controller may be configured or programmed to control at least one of steering that is required in the movement of the agricultural machine, adjustment of the moving speed, or beginning and ending of a move. In the case of controlling a work vehicle having an implement attached thereto, the controller may be configured or programmed to control raising or lowering of the implement, beginning and ending of an operation of the implement, and so on. A move based on self-driving may include not only moving of an agricultural machine that moves along a predetermined path toward a destination, but also moving of an agricultural machine that follows a target of tracking. An agricultural machine that performs self-driving may also move partly based on the user's instructions. Moreover, an agricultural machine that performs self-driving may operate not only in a self-driving mode but also in a manual driving mode, where the agricultural machine moves through manual operations of the driver. When performed not manually but through the action of a controller, the steering of an agricultural machine will be referred to as "automatic steering". A portion of, or the entirety of, the controller may reside outside the agricultural machine. Control signals, commands, data, etc. may be communicated between the agricultural machine and a controller residing outside the agricultural machine. An agricultural machine that performs self-driving may move autonomously while sensing the surrounding environment, without any person being involved in the controlling of the movement of the agricultural machine. An agricultural machine that is capable of autonomous movement is able to travel inside the field or outside the field (e.g., on roads) in an unmanned manner. During an autonomous operations of detecting and avoiding obstacles may be performed.

A "work plan" is data defining a plan of one or more tasks of agricultural work to be performed by an agricultural machine. The work plan may include, for example, information representing the order of the tasks of agricultural work to be performed by an agricultural machine or the field where each of the tasks of agricultural work is to be performed. The work plan may include information representing the time and the date when each of the tasks of agricultural work is to be performed. The work plan may be created by a processor communicating with the agricultural machine to manage the agricultural machine or a processor mounted on the agricultural machine. The processor can be configured or programmed to create a work plan based on, for example, information input by the user (agricultural business executive, agricultural worker, etc.) manipulating a terminal device. In this specification, the processor communicating with the agricultural machine to manage the agricultural machine will be referred to as a "management device". The management device may manage agricultural work of a plurality agricultural machines. In this case, the management device may create a work plan including information on each task of agricultural work to be performed by each of the plurality of agricultural machines. The work plan may be downloaded to each of the agricultural machines and stored in a storage in each of the agricultural machines. In order to perform the scheduled agricultural work in accordance with the work plan, each agricultural machine can automatically move to a field and perform the agricultural work.

An "environment map" is data representing, with a predetermined coordinate system, the position or the region of an object existing in the environment where the agricultural machine moves. The environment map may be referred to simply as a "map" or "map data". The coordinate system defining the environment map is, for example, a world coordinate system such as a geographic coordinate system fixed to the globe. Regarding the object existing in the environment, the environment map may include information other than the position (e.g., attribute information or other types of information). The "environment map" encompasses various type of maps such as a point cloud map and a lattice map. Data on a local map or a partial map that is generated or processed in a process of constructing the environment map is also referred to as a "map" or "map data".

An "agricultural road" is a road used mainly for agriculture. An "agricultural road" is not limited to a road paved with asphalt, and encompasses unpaved roads covered with soil, gravel or the like. An "agricultural road" encompasses roads (including private roads) on which only vehicle-type agricultural machines (e.g., work vehicles such as tractors, etc.) are allowed to travel and roads on which general vehicles (automobiles, trucks, buses, etc.) are also allowed to travel. The work vehicles may automatically travel on a general road in addition to an agricultural road. The "general road" is a road maintained for traffic of general vehicles.

Hereinafter, example embodiments of the present disclosure will be described. Note, however, that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of the claims. In the following description, elements having identical or similar functions are denoted by identical reference numerals.

The following example embodiments are only exemplary, and the techniques according to the present disclosure are not limited to the following example embodiments. For example, numerical values, shapes, materials, steps, orders of steps, layout of a display screen, etc. which are indicated in the following example embodiments are only exemplary, and admit of various modifications so long as it makes technological sense. Any one implementation may be combined with another so long as it makes technological sense to do so.

Hereinafter, example embodiments in which techniques according to the present disclosure are applied to a work vehicle, such as a tractor, which is an example of agricultural machine, will be mainly described. The techniques and example embodiments according to the present disclosure are also applicable to other types of agricultural machines in addition to the work vehicle such as a tractor.

FIG. 1 is a diagram providing an overview of an agriculture management system 1 according to an illustrative example embodiment of the present disclosure. The agriculture management system 1 shown in FIG. 1 includes a work vehicle 100, a terminal device 400, and a management device 600. The terminal device 400 includes a computer used by a user performing remote monitoring of the work vehicle 100. The management device 600 includes a computer managed by a business operator running the agriculture management system 1. The work vehicle 100, the terminal device 400 and the management device 600 can communicate with each other via the network 80. FIG. 1 shows one work vehicle 100, but the agriculture management system 1 may include a plurality of the work vehicles or any other agricultural machine.

The work vehicle 100 according to the present example embodiment is a tractor. The work vehicle 100 can have an implement attached to its rear and/or its front. While performing agricultural work in accordance with the type of the implement, the work vehicle 100 is able to travel inside a field. The work vehicle 100 may travel inside the field or outside the field with no implement being attached thereto.

The work vehicle 100 has a self-driving function. In other words, the work vehicle 100 can travel by the action of a controller, rather than manually. The controller according to the present example embodiment is provided inside the work vehicle 100, and is configured or programmed to control both the speed and steering of the work vehicle 100. The work vehicle 100 can perform self-traveling outside the field (e.g., on roads) as well as inside the field.

The work vehicle 100 includes a device usable for positioning or localization, such as a GNSS receiver or an LiDAR sensor. Based on the position of the work vehicle 100 and information on a target path, the controller of the work vehicle 100 causes the work vehicle 100 to automatically travel. In addition to controlling the travel of the work vehicle 100, the controller is also configured or programmed to control the operation of the implement. As a result, while automatically traveling inside the field, the work vehicle 100 is able to perform agricultural work by using the implement. In addition, the work vehicle 100 is able to automatically travel along the target path on a road outside the field (e.g., an agricultural road or a general road). The work vehicle 100 travels in a self-traveling mode along roads outside the field with the effective use of data output from sensors, such as the cameras 120, the obstacle sensors 130 and the LiDAR sensor 140.

The management device 600 includes a computer to manage the agricultural work performed by the work vehicle 100. The management device 600 may be, for example, a server computer that performs centralized management on information regarding the field on the cloud and supports agriculture by use of the data on the cloud. The management device 600, for example, creates a work plan for the work vehicle 100 and causes the work vehicle 100 to execute agricultural work in accordance with the work plan. The management device 600 generates a target path in the field based on, for example, the information entered by a user using the terminal unit 400 or any other device. The management device 600 may generate and edit an environment map based on data collected by the work vehicle 100 or any other movable body by use of the sensor such as a LiDAR sensor. The management device 600 transmits data on the work plan, the target path and the environment map thus generated to the work vehicle 100. The work vehicle 100 automatically moves and performs agricultural work based on the data.

The terminal device 400 includes a computer that is used by a user who is at a remote place from the work vehicle 100. The terminal device 400 shown in FIG. 1 includes a laptop computer, but the terminal device 400 is not limited to this. The terminal device 400 may be a stationary computer such as a desktop PC (personal computer), or a mobile terminal such as a smartphone or a tablet computer. The terminal device 400 may be used to perform remote monitoring of the work vehicle 100 or remote-manipulate the work vehicle 100. For example, the terminal device 400 can display, on a display screen thereof, a video captured by one or more cameras (imagers) included in the work vehicle 100. The terminal device 400 can also display, on the display screen thereof, a setting screen allowing the user to input information necessary to create a work plan (e.g., a schedule of each task of agricultural work) for the work vehicle 100. When the user inputs necessary information to the setting screen and performs a manipulation to transmit the information, the terminal device 400 transmits the input information to the management device 600. The management device 600 creates a work plan based on the information. The terminal device 400 may further have a function of displaying, on a display screen thereof, a setting screen allowing the user to input information necessary to set a target path.

Hereinafter, a configuration and an operation of the system according to the present example embodiment will be described in more detail.

Figure 2:
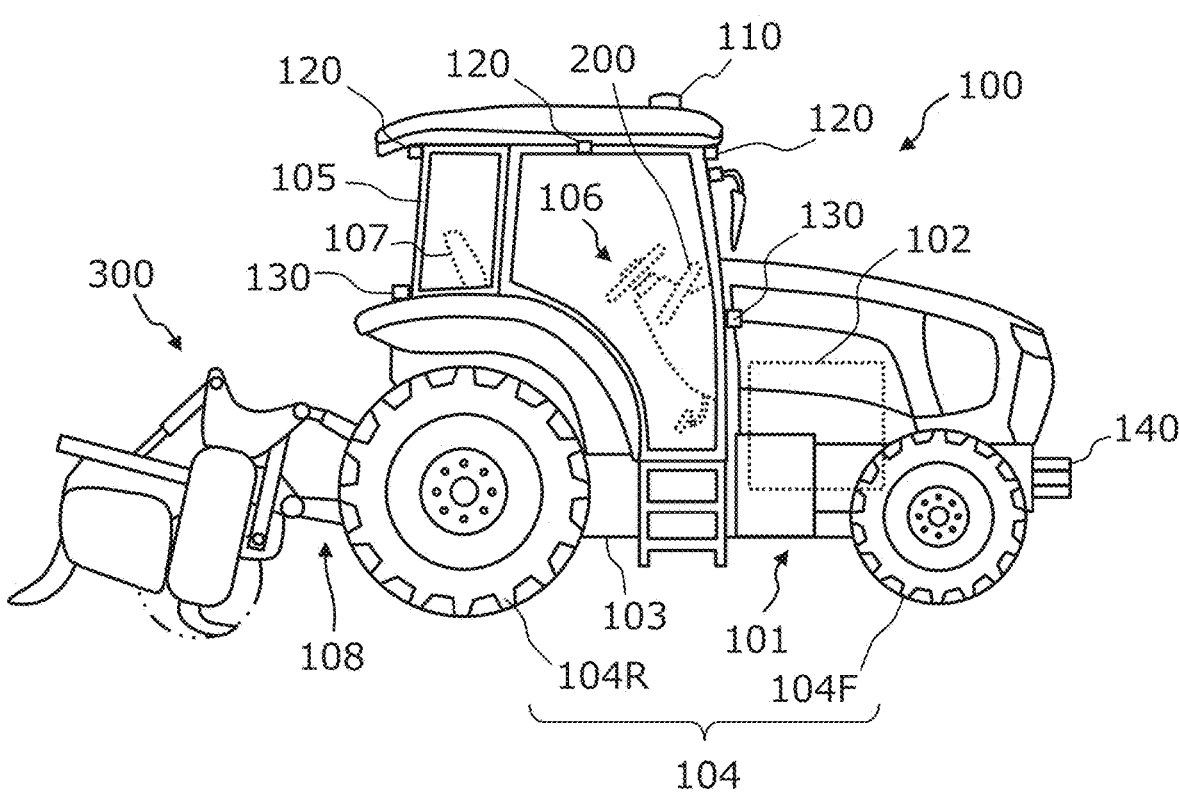
FIG. 2 is a side view schematically showing an example of work vehicle and an example of implement that is linked to the work vehicle.

FIG. 2 is a side view schematically showing an example of the work vehicle 100 and an example of implement 300 linked to the work vehicle 100. The work vehicle 100 according to the present example embodiment can operate both in a manual driving mode and a self-driving mode. In the self-driving mode, the work vehicle 100 is able to perform unmanned travel. The work vehicle 100 can perform self-driving both inside a field and outside the field.

As shown in FIG. 2, the work vehicle 100 includes a vehicle body 101, a prime mover (engine) 102, and a transmission 103. On the vehicle body 101, wheels 104 with tires and a cabin 105 are provided. The wheels 104 include a pair of front wheels 104F and a pair of rear wheels 104R. Inside the cabin 105, a driver's seat 107, a steering device 106, an operational terminal 200, and switches for manipulation are provided. In the case where the work vehicle 100 performs tasked travel inside the field, either or both of the front wheels 104F and the rear wheels 104R may be a plurality of wheels (crawlers) with a continuous track rather than wheels with tires.

The work vehicle 100 can include at least one sensor to sense the environment around the work vehicle 100 and a processor to process sensing data output from the at least one sensor. In the example shown in FIG. 2, the work vehicle 100 includes a plurality of sensors. The sensors include a plurality of cameras 120, a LiDAR sensor 140, and a plurality of obstacle sensors 130.

The cameras may 120 be provided at the front/rear/right/left of the work vehicle 100, for example. The cameras 120 image the environment around the work vehicle 100 and generate image data. The images acquired by the cameras 120 can be output to a processor included in the work vehicle 100 and transmitted to the terminal device 400, which is responsible for remote monitoring. Also, the images may be used to monitor the work vehicle 100 during unmanned driving. The cameras 120 may also be used to generate images to allow the work vehicle 100, traveling on a road outside the field (an agricultural road or a general road), to recognize objects, obstacles, white lines, road signs, traffic signs or the like in the surroundings of the work vehicle 100.

The LiDAR sensor 140 in the example shown in FIG. 2 is disposed on a bottom portion of a front surface of the vehicle body 101. The LiDAR sensor 140 may be disposed at any other position. For example, the LiDAR sensor 140 may be provided at the upper portion of the cabin 105. The LiDAR sensor 140 can be a 3D-LiDAR sensor but may be a 2D-LiDAR sensor. The LiDAR sensor 140 senses the environment around the work vehicle 100 to output sensing data. While the work vehicle 100 is traveling mainly outside the field, the LiDAR sensor 140 repeatedly outputs sensor data representing the distance and the direction between an object existing in the environment around the work vehicle 100 and each of measurement points, or three-dimensional or two-dimensional coordinate values of each of the measurement points. The sensor data output from the LiDAR sensor 140 is processed by the controller of the work vehicle 100. The controller can be configured or programmed to perform localization of the work vehicle 100 by matching the sensor data against the environment map. The controller can be configured or programmed to further detect an object such as an obstacle existing in the surroundings of the work vehicle 100 based on the sensor data. The controller can utilize an algorithm such as, for example, SLAM (Simultaneous Localization and Mapping) to generate or edit an environment map. The work vehicle 100 may include a plurality of LiDAR sensors disposed at different positions with different orientations.

The plurality of obstacle sensors 130 shown in FIG. 2 are provided at the front and the rear of the cabin 105. The obstacle sensors 130 may be disposed at other positions. For example, one or more obstacle sensors 130 may be disposed at any position at the sides, the front or the rear of the vehicle body 101. The obstacle sensors 130 may include, for example, a laser scanner or an ultrasonic sonar. The obstacle sensors 130 may be used to detect obstacles around the work vehicle 100 during self-traveling to cause the work vehicle 100 to halt or detour around the obstacles. The LiDAR sensor 140 may be used as one of the obstacle sensors 130.

The work vehicle 100 further includes a GNSS unit 110. The GNSS unit 110 includes a GNSS receiver. The GNSS receiver may include an antenna to receive a signal(s) from a GNSS satellite(s) and a processor to calculate the position of the work vehicle 100 based on the signal(s) received by the antenna. The GNSS unit 110 receives satellite signals transmitted from the plurality of GNSS satellites, and performs positioning based on the satellite signals. GNSS is the general term for satellite positioning systems such as GPS (Global Positioning System), QZSS (Quasi-Zenith Satellite System; e.g., MICHIBIKI), GLONASS, Galileo, and BeiDou. Although the GNSS unit 110 according to the present example embodiment is disposed above the cabin 105, it may be disposed at any other position.

The GNSS unit 110 may include an inertial measurement unit (IMU). Signals from the IMU can be used to complement position data. The IMU can measure a tilt or a small motion of the work vehicle 100. The data acquired by the IMU can be used to complement the position data based on the satellite signals, so as to improve the performance of positioning.

The controller of the work vehicle 100 may be configured or programmed to utilize, for positioning, the sensing data acquired by the sensors such as the cameras 120 and/or the LIDAR sensor 140, in addition to the positioning results provided by the GNSS unit 110. In the case where objects serving as characteristic points exist in the environment that is traveled by the work vehicle 100, as in the case of an agricultural road, a forest road, a general road or an orchard, the position and the orientation of the work vehicle 100 can be estimated with a high accuracy based on data that is acquired by the cameras 120 and/or the LiDAR sensor 140 and on an environment map that is previously stored in the storage. By correcting or complementing position data based on the satellite signals using the data acquired by the cameras 120 and/or the LiDAR sensor 140, it becomes possible to identify the position of the work vehicle 100 with a higher accuracy.

The prime mover 102 may be a diesel engine, for example. Instead of a diesel engine, an electric motor may be used. The transmission 103 can change the propulsion and the moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the steered wheels, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force to change the steering angle of the front wheels 104F. When automatic steering is performed, under the control of the controller disposed in the work vehicle 100, the steering angle may be automatically adjusted by the power of the hydraulic device or the electric motor.

A linkage device 108 is provided at the rear of the vehicle body 101. The linkage device 108 includes, e.g., a three-point linkage (also referred to as a "three-point link" or a "three-point hitch"), a PTO (Power Take Off) shaft, a universal joint, and a communication cable. The linkage device 108 allows the implement 300 to be attached to, or detached from, the work vehicle 100. The linkage device 108 is able to raise or lower the three-point link with a hydraulic device, for example, thus changing the position and/or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided at the front portion of the vehicle body 101. In that case, the implement 300 can be connected with the front portion of the work vehicle 100.

Although the implement 300 shown in FIG. 2 is a rotary tiller, the implement 300 is not limited to a rotary tiller. For example, any arbitrary implement such as a seeder, a spreader, a transplanter, a mower, a rake implement, a baler, a harvester, a sprayer, or a harrow, can be connected to the work vehicle 100 for use.

The work vehicle 100 shown in FIG. 2 can be driven by human driving; alternatively, it may only support unmanned driving. In that case, component elements which are only required for human driving, e.g., the cabin 105, the steering device 106, and the driver's seat 107 do not need to be provided in the work vehicle 100. An unmanned work vehicle 100 can travel via autonomous driving, or by remote operation by a user.

Figure 3:
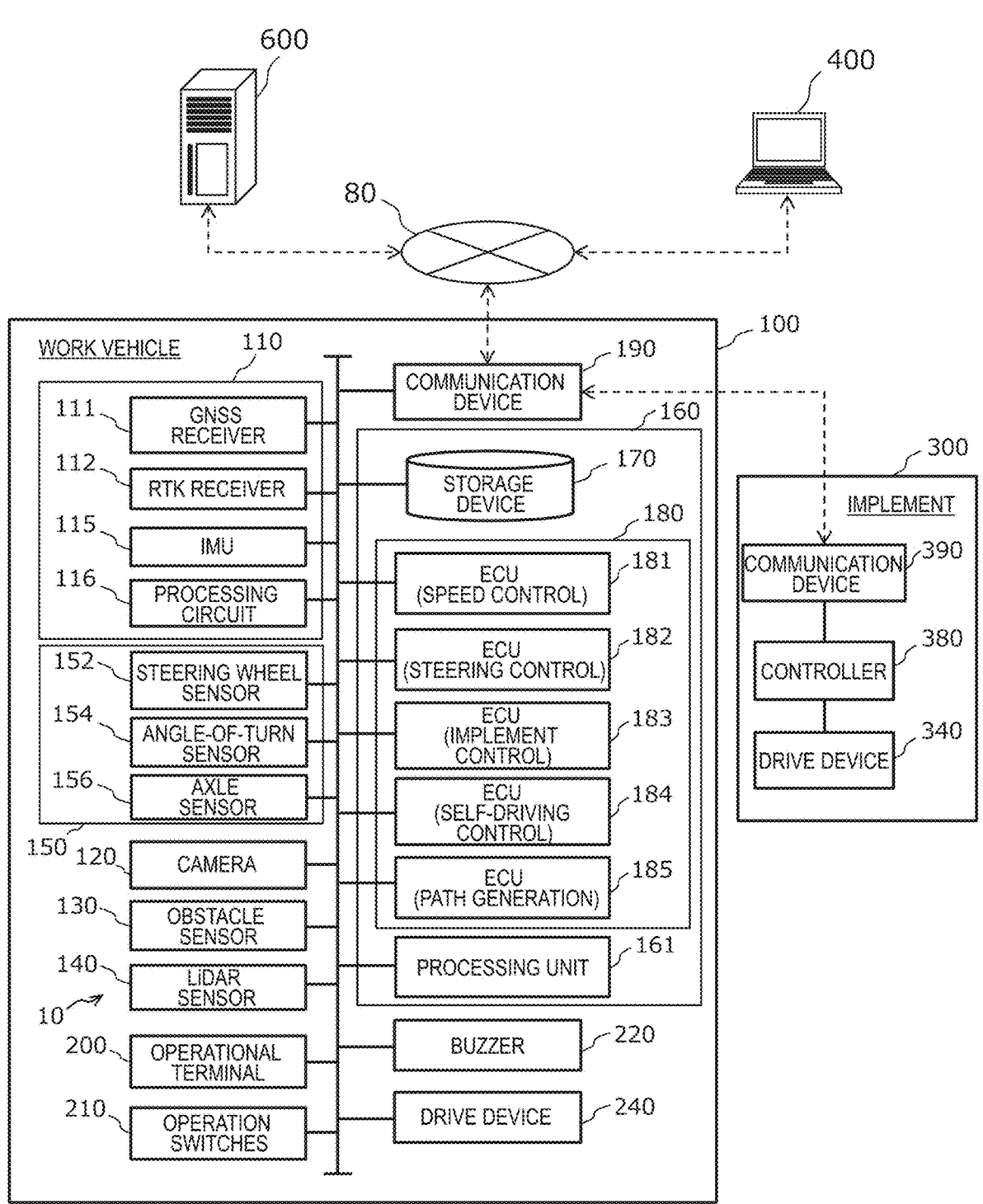
FIG. 3 is a block diagram showing an example configuration of the work vehicle and the implement.

FIG. 3 is a block diagram showing an example configuration of the work vehicle 100 and the implement 300. The work vehicle 100 and the implement 300 can communicate with each other via a communication cable that is included in the linkage device 108. The work vehicle 100 is able to communicate with the terminal device 400 and the management device 600 via the network 80.

In addition to the GNSS unit 110, the cameras 120, the obstacle sensors 130, the LiDAR sensor 140 and the operational terminal 200, the work vehicle 100 in the example of FIG. 3 includes sensors 150 to detect the operating status of the work vehicle 100, a control system 160, a communication device 190, operation switches 210, a buzzer 220, and a drive device 240. These component elements are communicably connected to each other via a bus. The GNSS unit 110 includes a GNSS receiver 111, an RTK receiver 112, an inertial measurement unit (IMU) 115, and a processing circuit 116. The sensors 150 include a steering wheel sensor 152, an angle-of-turn sensor 154, and a axle sensor 156. The control system 160 includes a processor 161, a storage 170 and a controller 180. The controller 180 includes a plurality of electronic control units (ECU) 181 to 185. The implement 300 includes a drive device 340, a controller 380, and a communication device 390. Note that FIG. 3 shows component elements which are relatively closely related to the operations of self-driving by the work vehicle 100, while other components are omitted from illustration.

The GNSS receiver 111 in the GNSS unit 110 receives satellite signals from the plurality transmitted of GNSS satellites and generates GNSS data based on the satellite signals. The GNSS data is generated in a predetermined format such as, for example, the NMEA-0183 format. The GNSS data may include, for example, the identification number, the angle of elevation, the azimuth angle, and a value representing the reception strength of each of the satellites from which the satellite signals are received.

Figure 4:
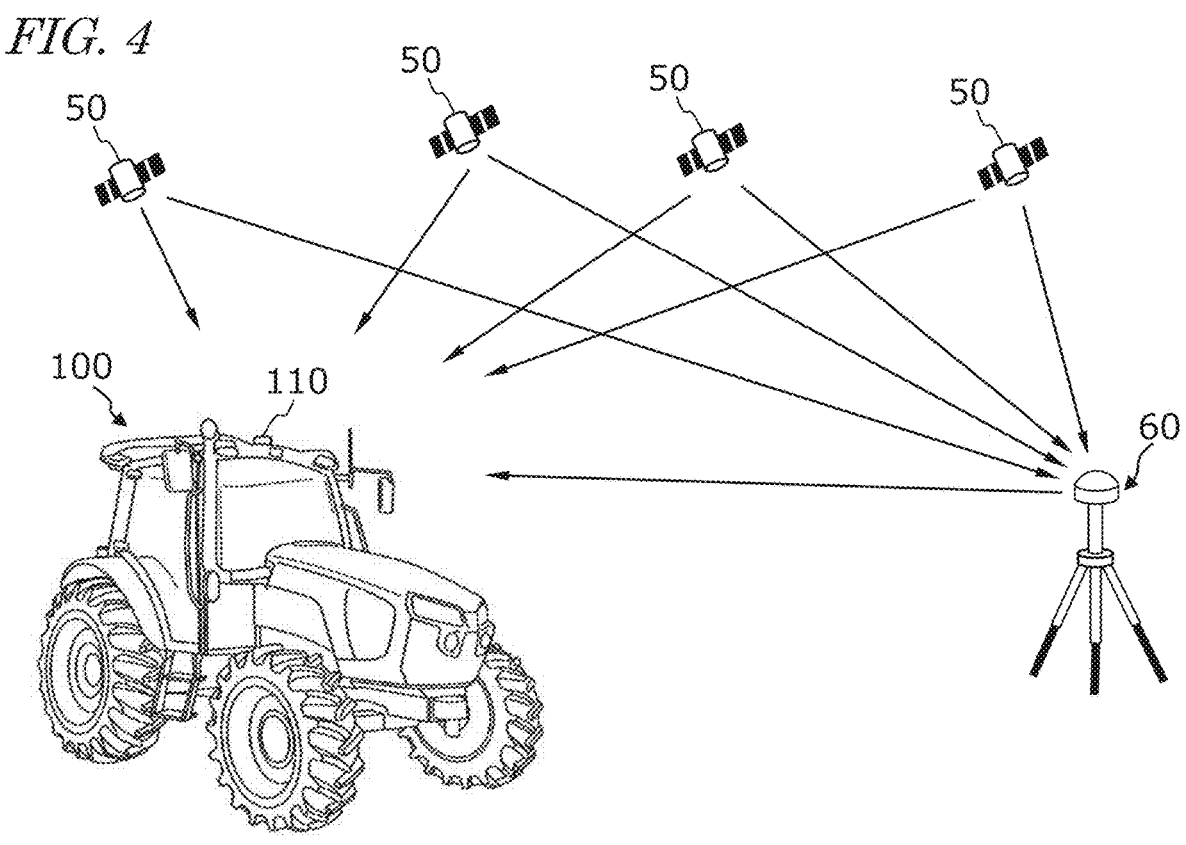
FIG. 4 is a conceptual diagram showing an example of the work vehicle performing positioning based on an RTK-GNSS.

The GNSS unit 110 shown in FIG. 3 performs positioning of the work vehicle 100 by utilizing an RTK (Real Time Kinematic)—GNSS. FIG. 4 is a conceptual diagram showing an example of the work vehicle 100 performing positioning based on the RTK-GNSS. In the positioning based on the RTK-GNSS, not only satellite signals transmitted from a plurality of GNSS satellites 50, but also a correction signal that is transmitted from a reference station 60 is used. The reference station 60 may be disposed near the field where the work vehicle 100 performs tasked travel (e.g., at a position within 10 km of the work vehicle 100). The reference station 60 generates a correction signal of, for example, an RTCM format based on the satellite signals received from the plurality of GNSS satellites 50, and transmits the correction signal to the GNSS unit 110. The RTK receiver 112, which includes an antenna and a modem, receives the correction signal transmitted from the reference station 60. Based on the correction signal, the processing circuit 116 of the GNSS unit 110 corrects the results of the positioning performed by use of the GNSS receiver 111. Use of the RTK-GNSS enables positioning with an accuracy on the order of several centimeters of errors, for example. Positional data including latitude, longitude, and altitude information is acquired through the highly accurate positioning by the RTK-GNSS. The GNSS unit 110 calculates the position of the work vehicle 100 as frequently as, for example, one to ten times per second.

Note that the positioning method is not limited to being performed by use of an RTK-GNSS; any arbitrary positioning method (e.g., an interferometric positioning method or a relative positioning method) that provides positional data with the necessary accuracy can be used. For example, positioning may be performed by utilizing a VRS (Virtual Reference Station) or a DGPS (Differential Global Positioning System). In the case where positional data with the necessary accuracy can be obtained without the use of the correction signal transmitted from the reference station 60, positional data may be generated without using the correction signal. In that case, the GNSS unit 110 does not need to include the RTK receiver 112.

Even in the case where the RTK-GNSS is used, at a site where the correction signal from the reference station 60 cannot be acquired (e.g., on a road far from the field), the position of the work vehicle 100 is estimated by another method with no use of the signal from the RTK receiver 112. For example, the position of the work vehicle 100 may be estimated by matching the data output from the LiDAR sensor 140 and/or the cameras 120 against a highly accurate environment map.

The GNSS unit 110 according to the present example embodiment further includes the IMU 115. The IMU 115 may include a 3-axis accelerometer and a 3-axis gyroscope. The IMU 115 may include a direction sensor such as a 3-axis geomagnetic sensor. The IMU 115 functions as a motion sensor which can output signals representing parameters as such acceleration, velocity, displacement, and attitude of the work vehicle 100. Based not only on the satellite signals and the correction signal but also on a signal that is output from the IMU 115, the processing circuit 116 can estimate the position and orientation of the work vehicle 100 with a higher accuracy. The signal that is output from the IMU 115 may be used for the correction or complementation of the position that is calculated based on the satellite signals and the correction signal. The IMU 115 outputs a signal more frequently than the GNSS receiver 111. Utilizing this signal that is output highly frequently, the processing circuit 116 allows the position and orientation of the work vehicle 100 to be measured more frequently (e.g., about 10 Hz or above). Instead of the IMU 115, a 3-axis accelerometer and a 3-axis gyroscope may be separately provided. The IMU 115 may be provided as a separate device from the GNSS unit 110.

The cameras 120 are imagers that image the environment around the work vehicle 100. Each of the cameras 120 includes an image sensor such as a CCD (Charge Coupled Device) or a CMOS (Complementary Metal Oxide Semiconductor), for example. In addition, each camera 120 may include an optical system including one or more lenses and a signal processing circuit. During travel of the work vehicle 100, the cameras 120 image the environment around the work vehicle 100, and generate image data (e.g., motion picture data). The cameras 120 are able to capture motion pictures at a frame rate of 3 frames/second (fps: frames per second) or greater, for example. The images generated by the cameras 120 may be used by a remote supervisor to check the environment around the work vehicle 100 with the terminal device 400, for example. The images generated by the cameras 120 may also be used for the purpose of positioning and/or detection of obstacles. As shown in FIG. 2, the plurality of cameras 120 may be provided at different positions on the work vehicle 100, or a single camera 120 may be provided. A visible camera(s) to generate visible light images and an infrared camera(s) to generate infrared images may be separately provided. Both of a visible camera(s) and an infrared camera(s) may be provided as cameras to generate images for monitoring purposes. The infrared camera(s) may also be used for detection of obstacles at nighttime.

The obstacle sensors 130 detect objects existing around the work vehicle 100. Each of the obstacle sensors 130 may include a laser scanner or an ultrasonic sonar, for example. When an object exists at a position within a predetermined distance from one of the obstacle sensors 130, the obstacle sensor 130 outputs a signal indicating the presence of the obstacle. The plurality of obstacle sensors 130 may be provided at different positions on the work vehicle 100. For example, a plurality of laser scanners and a plurality of ultrasonic sonars may be disposed at different positions on the work vehicle 100. Providing such a great number of obstacle sensors 130 can reduce blind spots in monitoring obstacles around the work vehicle 100.

The steering wheel sensor 152 measures the angle of rotation of the steering wheel of the work vehicle 100. The angle-of-turn sensor 154 measures the angle of turn of the front wheels 104F, which are the steered wheels. Measurement values by the steering wheel sensor 152 and the angle-of-turn sensor 154 are used for steering control by the controller 180.

The axle sensor 156 measures the rotational speed, i.e., the number of revolutions per unit time, of a axle that is connected to the wheels 104. The axle sensor 156 may be a sensor including a magnetoresistive element (MR), a Hall generator, or an electromagnetic pickup, for example. The axle sensor 156 outputs a numerical value indicating the number of revolutions per minute (unit: rpm) of the axle, for example. The axle sensor 156 is used to measure the speed of the work vehicle 100.

The drive device 240 includes various types of devices required to cause the work vehicle 100 to travel and to drive the implement 300; for example, the prime mover 102, the transmission 103, the steering device 106, the linkage device 108 and the like described above. The prime mover 102 may include an internal combustion engine such as, for example, a diesel engine. The drive device 240 may include an electric motor for traction instead of, or in addition to, the internal combustion engine.

The buzzer 220 is an audio output device to present an alarm sound to alert the user of an abnormality. For example, the buzzer 220 may present an alarm sound when an obstacle is detected during self-driving. The buzzer 220 is controlled by the controller 180.

The processor 161 may be a microprocessor or a microcontroller. The processor 161 is configured or programmed to process sensing data output from sensors, such as the cameras 120, the obstacle sensors 130 and the LiDAR sensor 140. For example, the processor 161 is configured or programmed to detect objects around the work vehicle 100 based on data output from the cameras 120, the obstacle sensors 130 and the LiDAR sensor 140.

The storage 170 includes one or more storage mediums such as a flash memory or a magnetic disc. The storage 170 stores various data that is generated by the GNSS unit 110, the cameras 120, the obstacle sensors 130, the LiDAR sensor 140, the sensors 150, and the controller 180. The data that is stored by the storage 170 may include map data on the environment where the work vehicle 100 travels (environment map) and data on a target path for self-driving. The environment map includes information on a plurality of fields where the work vehicle 100 performs agricultural work and roads around the fields. The environment map and the target path may be generated by a processor in the management device 600. The controller 180 may be configured or programmed to perform a function of generating or editing an environment map and a target path. The controller 180 can be configured or programmed to edit the environment map and the target path, acquired from the management device 600, in accordance with the environment where the work vehicle 100 travels. The storage 170 also stores data on a work plan received by the communication device 190 from the management device 600.

The storage 170 also stores a computer program(s) to cause the processor 161 and each of the ECUs in the controller 180 to perform various operations described below. Such a computer program(s) may be provided to the work vehicle 100 via a storage medium (e.g., a semiconductor memory, an optical disc, etc.) or through telecommunication lines (e.g., the Internet). Such a computer program(s) may be marketed as commercial software.

The controller 180 includes the plurality of ECUs. The plurality of ECUs include, for example, the ECU 181 for speed control, the ECU 182 for steering control, the ECU 183 for implement control, the ECU 184 for self-driving control, and the ECU 185 for path generation.

The ECU 181 controls the prime mover 102, the transmission 103 and brakes included in the drive device 240, thus controlling the speed of the work vehicle 100.

The ECU 182 controls the hydraulic device or the electric motor included in the steering device 106 based on a measurement value of the steering wheel sensor 152, thus controlling the steering of the work vehicle 100.

In order to cause the implement 300 to perform a desired operation, the ECU 183 controls the operations of the three-point link, the PTO shaft and the like that are included in the linkage device 108. Also, the ECU 183 generates a signal to control the operation of the implement 300, and transmits this signal from the communication device 190 to the implement 300.

Based on data output from the GNSS unit 110, the cameras 120, the obstacle sensors 130, the LiDAR sensor 140, the sensors 150 and the processor 161, the ECU 184 performs computation and control for achieving self-driving. For example, the ECU 184 specifies the position of the work vehicle 100 based on the data output from at least one of the GNSS unit 110, the cameras 120 and the LiDAR sensor 140. Inside the field, the ECU 184 may determine the position of the work vehicle 100 based only on the data output from the GNSS unit 110. The ECU 184 may estimate or correct the position of the work vehicle 100 based on the data acquired by the cameras 120 and/or the LiDAR sensor 140. Use of the data acquired by the cameras 120 and/or the LiDAR sensor 140 allows the accuracy of the positioning to be further improved. Outside the field, the ECU 184 estimates the position of the work vehicle 100 by use of the data output from the LiDAR sensor 140 and/or the cameras 120. For example, the ECU 184 may estimate the position of the work vehicle 100 by matching the data output from the LiDAR sensor 140 and/or the cameras 120 against the environment map. During self-driving, the ECU 184 performs computation necessary for the work vehicle 100 to travel along a target path, based on the estimated position of the work vehicle 100. The ECU 184 sends the ECU 181 a command to change the speed, and sends the ECU 182 a command to change the steering angle. In response to the command to change the speed, the ECU 181 controls the prime mover 102, the transmission 103 or the brakes to change the speed of the work vehicle 100. In response to the command to change the steering angle, the ECU 182 controls the steering device 106 to change the steering angle.

The ECU 185 can determine a destination of the work vehicle 100 based on the work plan stored in the storage 170, and determine a target path from a beginning point to a target point of the movement of the work vehicle 100. The ECU 185 may perform the process of detecting objects around the work vehicle 100 based on the data output from the cameras 120, the obstacle sensors 130 and the LiDAR sensor 140.

Through the actions of these ECUs, the controller 180 realizes self-driving. During self-driving, the controller 180 controls the drive device 240 based on the measured or estimated position of the work vehicle 100 and on the target path. As a result, the controller 180 can cause the work vehicle 100 to travel along the target path.

The plurality of ECUs included in the controller 180 can communicate with each other in accordance with a vehicle bus standard such as, for example, a CAN (Controller Area Network). Instead of the CAN, faster communication methods such as Automotive Ethernet (registered trademark) may be used. Although the ECUs 181 to 185 are illustrated as individual blocks in FIG. 3, the function of each of the ECU 181 to 185 may be implemented by a plurality of ECUs. Alternatively, an onboard computer that integrates the functions of at least some of the ECUs 181 to 185 may be provided. The controller 180 may include ECUs other than the ECUs 181 to 185, and any number of ECUs may be provided in accordance with functionality. Each ECU includes a processing circuit including one or more processors. The controller 180 may include the processor 161. The processor 161 may be integrated with any of the ECUs included in the controller 180.

The communication device 190 is a device including a circuit communicating with the implement 300, the terminal device 400 and the management device 600. The communication device 190 includes circuitry to perform exchanges of signals complying with an ISOBUS standard such as ISOBUS-TIM, for example, between itself and the communication device 390 of the implement 300. This allows the implement 300 to perform a desired operation, or allows information to be acquired from the implement 300. The communication device 190 may further include an antenna and a communication circuit to exchange signals via the network 80 with communication devices of the terminal device 400 and the management device 600. The network 80 may include a 3G, 4G, 5G, or any other cellular mobile communications network and the Internet, for example. The communication device 190 may have a function of communicating with a mobile terminal that is used by a supervisor who is situated near the work vehicle 100. With such a mobile terminal, communication may be performed based on any arbitrary wireless communication standard, e.g., Wi-Fi (registered trademark), 3G, 4G, 5G or any other cellular mobile communication standard, or Bluetooth (registered trademark).

The operational terminal 200 is a terminal for the user to perform a manipulation related to the travel of the work vehicle 100 and the operation of the implement 300, and is also referred to as a virtual terminal (VT). The operational terminal 200 may include a display device such as a touch screen panel, and/or one or more buttons. The display device may be a display such as a liquid crystal display or an organic light-emitting diode (OLED) display, for example. By manipulating the operational terminal 200, the user can perform various manipulations, such as, for example, switching ON/OFF the self-driving mode, recording or editing an environment map, setting a target path, and switching ON/OFF the implement 300. At least a portion of these manipulations may also be realized by manipulating the operation switches 210. The operational terminal 200 may be configured so as to be detachable from the work vehicle 100. A user who is at a remote place from the work vehicle 100 may manipulate the detached operational terminal 200 to control the operation of the work vehicle 100. Instead of the operational terminal 200, the user may manipulate a computer on which necessary application software is installed, for example, the terminal device 400, to control the operation of the work vehicle 100.

Figure 5:
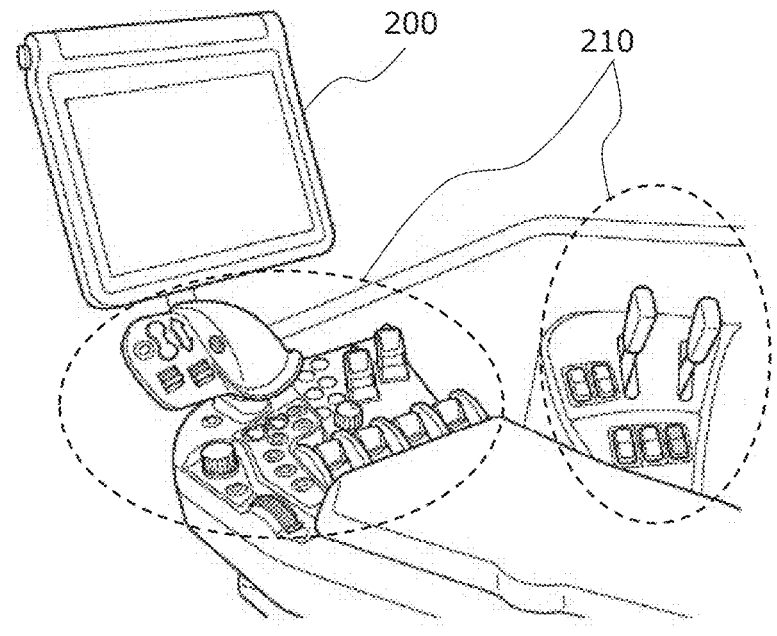
FIG. 5 is a diagram showing an example of operational terminal and an example of operation switches disposed in a cabin.

FIG. 5 is a diagram showing an example of the operational terminal 200 and an example of the operation switches 210 both provided in the cabin 105. In the cabin 105, the operation switches 210, including a plurality of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to raise or lower the implement 300, and the like. In the case where the work vehicle 100 only performs unmanned driving and lacks human driving functionality, the work vehicle 100 does not need to include the operation switches 210.

The drive device 340 in the implement 300 shown in FIG. 3 performs operations necessary for the implement 300 to perform predetermined work. The drive device 340 includes a device suitable for uses of the implement 300, for example, a hydraulic device, an electric motor, a pump or the like. The controller 380 controls the operation of the drive device 340. In response to a signal that is transmitted from the work vehicle 100 via the communication device 390, the controller 380 causes the drive device 340 to perform various operations. Moreover, a signal that is in accordance with the state of the implement 300 can be transmitted from the communication device 390 to the work vehicle 100.

Figure 6:
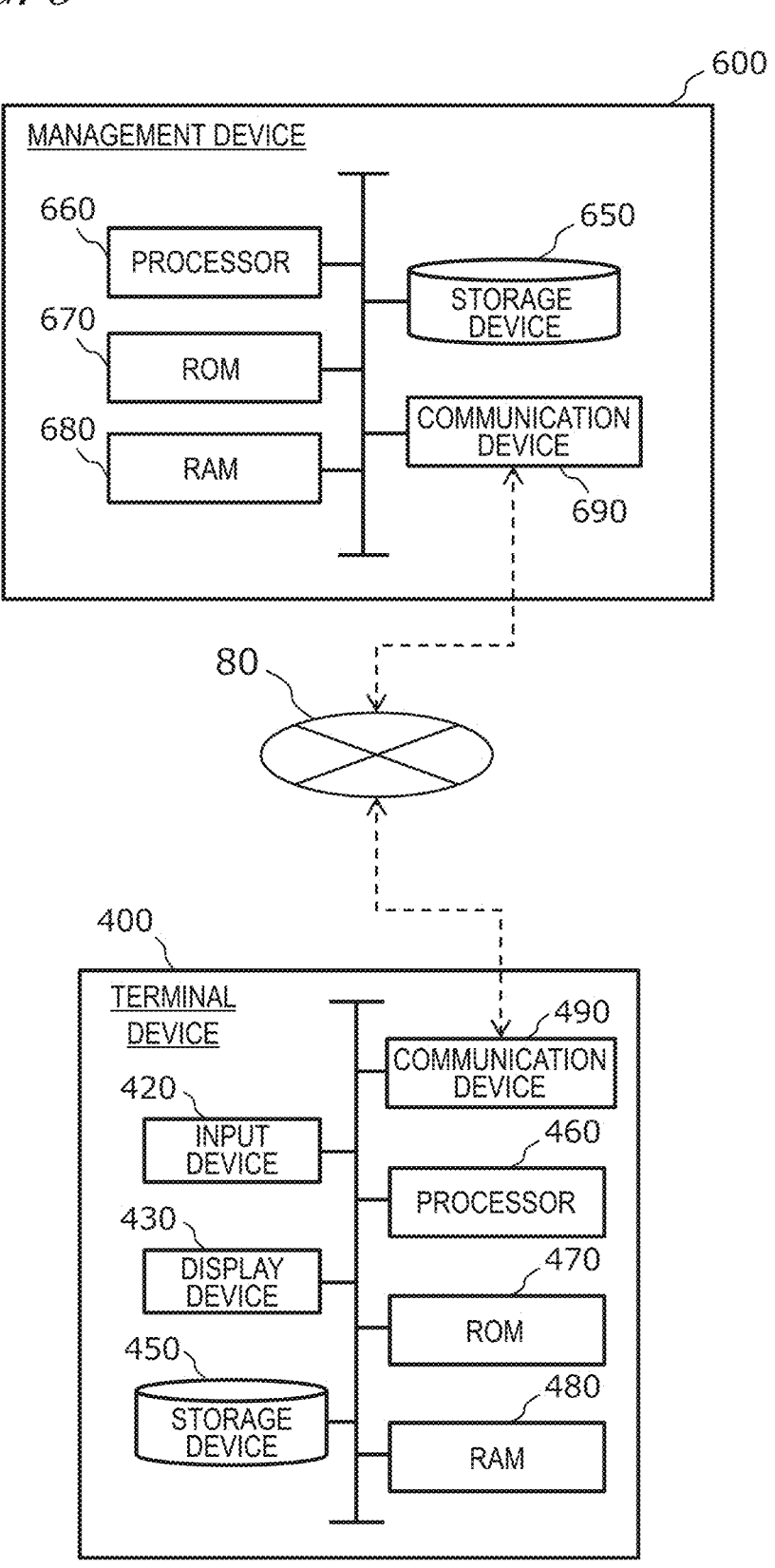
FIG. 6 is a block diagram showing an example of hardware configuration of a management device and a terminal device.

Now, a configuration of the management device 600 and the terminal device 400 will be described with reference to FIG. 6. FIG. 6 is a block diagram showing an example of schematic hardware configuration of the management device 600 and the terminal device 400.

The management device 600 includes a storage 650, a processor 660, a ROM (Read Only Memory) 670, a RAM (Random Access Memory) 680, and a communication device 690. These component elements are communicably connected to each other via a bus. The management device 600 may function as a cloud server to manage the schedule of the agricultural work to be performed by the work vehicle 100 in a field and support agriculture by use of the data managed by the management device 600 itself. The user can input information necessary to create a work plan by use of the terminal device 400 and upload the information to the management device 600 via the network 80. The management device 600 can create a schedule of agricultural work, that is, a work plan based on the information. The management device 600 can further generate or edit an environment map. The environment map may be distributed from a computer external to the management device 600.

The communication device 690 is a communication module to communicate with the work vehicle 100 and the terminal device 400 via the network 80. The communication device 690 can perform wired communication in compliance with communication standards such as, for example, IEEE1394 (registered trademark) or Ethernet (registered trademark). The communication device 690 may perform wireless communication in compliance with Bluetooth (registered trademark) or Wi-Fi, or cellular mobile communication based on 3G, 4G, 5G or any other cellular mobile communication standard.

The processor 660 may be, for example, a semiconductor integrated circuit including a central processing unit (CPU). The processor 660 may be realized by a microprocessor or a microcontroller. Alternatively, the processor 660 may be realized by an FPGA (Field Programmable Gate Array), a GPU (Graphics Processing Unit), an ASIC (Application Specific Integrated Circuit) or an ASSP (Application Specific Standard Product) each including a CPU, or a combination of two or more selected from these circuits. The processor 660 is configured or programmed to consecutively execute a computer program, describing commands to execute at least one process, stored in the ROM 670 and thus realizes a desired process.

The ROM 670 is, for example, a writable memory (e.g., PROM), a rewritable memory (e.g., flash memory) or a memory which can only be read from but cannot be written to. The ROM 670 stores a program to control operations of the processor 660. The ROM 670 does not need to be a single storage medium, and may be an assembly of a plurality of storage mediums. A portion of the assembly of the plurality of storage memories may be a detachable memory.

The RAM 680 provides a work area in which the control program stored in the ROM 670 is once developed at the time of boot. The RAM 680 does not need to be a single storage medium, and may be an assembly of a plurality of storage mediums.

The communication device 190 is a device including a circuit communicating with the implement 300, the terminal device 400 and the management device 600. The communication device 190 includes circuitry to perform exchanges of signals complying with an ISOBUS standard such as ISOBUS-TIM, for example, between itself and the communication device 390 of the implement 300. This allows the implement 300 to perform a desired operation, or allows information to be acquired from the implement 300. The communication device 190 may further include an antenna and a communication circuit to exchange signals via the network 80 with communication devices of the terminal device 400 and the management device 600. The network 80 may include a 3G, 4G, 5G, or any other cellular mobile communications network and the Internet, for example. The communication device 190 may have a function of communicating with a mobile terminal that is used by a supervisor who is situated near the work vehicle 100. With such a mobile terminal, communication may be performed based on any arbitrary wireless communication standard, e.g., Wi-Fi (registered trademark), 3G, 4G, 5G or any other cellular mobile communication standard, or Bluetooth (registered trademark).

The operational terminal 200 is a terminal for the user to perform a manipulation related to the travel of the work vehicle 100 and the operation of the implement 300, and is also referred to as a virtual terminal (VT). The operational terminal 200 may include a display device such as a touch screen panel, and/or one or more buttons. The display device may be a display such as a liquid crystal display or an organic light-emitting diode (OLED) display, for example. By manipulating the operational terminal 200, the user can perform various manipulations, such as, for example, switching ON/OFF the self-driving mode, recording or editing an environment map, setting a target path, and switching ON/OFF the implement 300. At least a portion of these manipulations may also be realized by manipulating the operation switches 210. The operational terminal 200 may be configured so as to be detachable from the work vehicle 100. A user who is at a remote place from the work vehicle 100 may manipulate the detached operational terminal 200 to control the operation of the work vehicle 100. Instead of the operational terminal 200, the user may manipulate a computer on which necessary application software is installed, for example, the terminal device 400, to control the operation of the work vehicle 100.

FIG. 5 is a diagram showing an example of the operational terminal 200 and an example of the operation switches 210 both provided in the cabin 105. In the cabin 105, the operation switches 210, including a plurality of switches that are manipulable to the user, are disposed. The operation switches 210 may include, for example, a switch to select the gear shift as to a main gear shift or a range gear shift, a switch to switch between a self-driving mode and a manual driving mode, a switch to switch between forward travel and backward travel, a switch to raise or lower the implement 300, and the like. In the case where the work vehicle 100 only performs unmanned driving and lacks human driving functionality, the work vehicle 100 does not need to include the operation switches 210.

The drive device 340 in the implement 300 shown in FIG. 3 performs operations necessary for the implement 300 to perform predetermined work. The drive device 340 includes a device suitable for uses of the implement 300, for example, a hydraulic device, an electric motor, a pump or the like. The controller 380 controls the operation of the drive device 340. In response to a signal that is transmitted from the work vehicle 100 via the communication device 390, the controller 380 causes the drive device 340 to perform various operations. Moreover, a signal that is in accordance with the state of the implement 300 can be transmitted from the communication device 390 to the work vehicle 100.

Now, a configuration of the management device 600 and the terminal device 400 will be described with reference to FIG. 6. FIG. 6 is a block diagram showing an example of schematic hardware configuration of the management device 600 and the terminal device 400.

The management device 600 includes a storage 650, a processor 660, a ROM (Read Only Memory) 670, a RAM (Random Access Memory) 680, and a communication device 690. These component elements are communicably connected to each other via a bus. The management device 600 may function as a cloud server to manage the schedule of the agricultural work to be performed by the work vehicle 100 in a field and support agriculture by use of the data managed by the management device 600 itself. The user can input information necessary to create a work plan by use of the terminal device 400 and upload the information to the management device 600 via the network 80. The management device 600 can create a schedule of agricultural work, that is, a work plan based on the information. The management device 600 can further generate or edit an environment map. The environment map may be distributed from a computer external to the management device 600.

The communication device 690 is a communication module to communicate with the work vehicle 100 and the terminal device 400 via the network 80. The communication device 690 can perform wired communication in compliance with communication standards such as, for example, IEEE1394 (registered trademark) or Ethernet (registered trademark). The communication device 690 may perform wireless communication in compliance with Bluetooth (registered trademark) or Wi-Fi, or cellular mobile communication based on 3G, 4G, 5G or any other cellular mobile communication standard.

The processor 660 may be, for example, a semiconductor integrated circuit including a central processing unit (CPU). The processor 660 may be realized by a microprocessor or a microcontroller. Alternatively, the processor 660 may be realized by an FPGA (Field Programmable Gate Array), a GPU (Graphics Processing Unit), an ASIC (Application Specific Integrated Circuit) or an ASSP (Application Specific Standard Product) each including a CPU, or a combination of two or more selected from these circuits. The processor 660 consecutively executes a computer program, describing commands to execute at least one process, stored in the ROM 670 and thus realizes a desired process.

The ROM 670 is, for example, a writable memory (e.g., PROM), a rewritable memory (e.g., flash memory) or a memory which can only be read from but cannot be written to. The ROM 670 stores a program to control operations of the processor 660. The ROM 670 does not need to be a single storage medium, and may be an assembly of a plurality of storage mediums. A portion of the assembly of the plurality of storage memories may be a detachable memory.

The RAM 680 provides a work area in which the control program stored in the ROM 670 is once developed at the time of boot. The RAM 680 does not need to be a single storage medium, and may be an assembly of a plurality of storage mediums.

The storage 650 mainly functions as a storage for a database. The storage 650 may be, for example, a magnetic storage or a semiconductor storage. An example of the magnetic storage is a hard disc drive (HDD). An example of the semiconductor storage is a solid state drive (SSD). The storage 650 may be a device independent from the management device 600. For example, the storage 650 may be a storage connected to the management device 600 via the network 80, for example, a cloud storage.

The terminal device 400 includes an input device 420, a display device 430, a storage 450, a processor 460, a ROM 470, a RAM 480, and a communication device 490. These component elements are communicably connected to each other via a bus. The input device 420 is a device to convert an instruction from the user into data and input the data to a computer. The input device 420 may be, for example, a keyboard, a mouse or a touch panel. The display device 430 may be, for example, a liquid crystal display or an organic EL display. The processor 460, the ROM 470, the RAM 480, the storage 450 and the communication device 490 are substantially the same as the corresponding component elements described above regarding the example of the hardware configuration of the management device 600, and will not be described in repetition.

2. Operation

Now, an operation of the work vehicle 100, the terminal device 400 and the management device 600 will be described.

[2-1. Self-Traveling Operation]

First, an example operation of self-traveling of the work vehicle 100 will be described. The work vehicle 100 according to the present example embodiment can automatically travel both inside and outside a field. Inside the field, the work vehicle 100 drives the implement 300 to perform predetermined agricultural work while traveling along a preset target path. When detecting an obstacle while traveling inside the field, the work vehicle 100 halts traveling and performs operations of presenting an alarm sound from the buzzer 220, transmitting an alert signal to the terminal device 400 and the like. Inside the field, the positioning of the work vehicle 100 is performed based mainly on data output from the GNSS unit 110. Meanwhile, outside the field, the work vehicle 100 automatically travels along a target path set for an agricultural road or a general road outside the field. While traveling outside the field, the work vehicle 100 travels with the effective use of data acquired by the cameras 120 and/or the LiDAR sensor 140. When an obstacle is detected outside the field, the work vehicle 100 avoids the obstacle or halts at the point. Outside the field, the position of the work vehicle 100 is estimated based on data output from the LiDAR sensor 140 and/or the cameras 120 in addition to positioning data output from the GNSS unit 110.

Hereinafter, an example of the operation performed when the work vehicle 100 performs self-traveling in the field is described.

Figure 7:
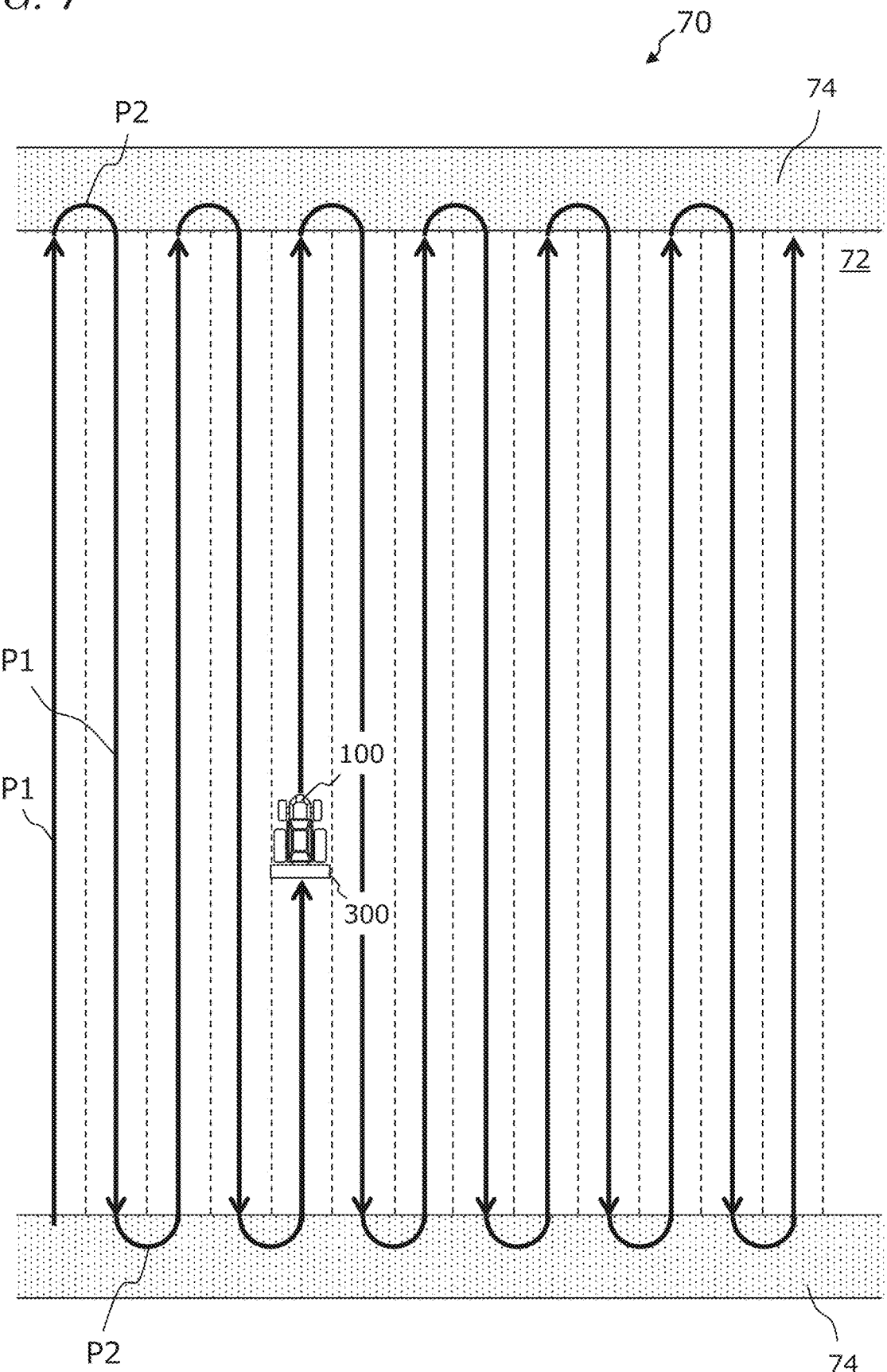
FIG. 7 is a diagram schematically showing an example of the work vehicle automatically traveling along a target path inside a field.

FIG. 7 is a diagram schematically showing an example of the work vehicle 100 automatically traveling along a target path in a field. In this example, the field 70 includes a work area 72, in which the work vehicle 100 performs work by using the implement 300, and headlands 74, which are located near outer edges of the field 70. The user may previously specify which regions of the field 70 on the map would correspond to the work area 72 and the headlands 74. The target path in this example includes a plurality of main paths P1 parallel to each other and a plurality of turning paths P2 interconnecting the plurality of main paths P1. The main paths P1 are located in the work area 72, whereas the turning paths P2 are located in the headlands 74. Although each of the main paths P1 in FIG. 7 is illustrated as a linear path, each main path P1 may also include a curved portion (s). Broken lines in FIG. 7 depict the working breadth of the implement 300. The working breadth is previously set and recorded in the storage 170. The working breadth may be set and recorded by the user manipulating the operational terminal 200 or the terminal 400. Alternatively, the working breadth may be device automatically recognized and recorded when the implement 300 is connected to the work vehicle 100. The interval between the plurality of main paths P1 may be set so as to be matched to the working breadth. The target path may be generated based on the manipulation made by the user, before self-driving is begun. The target path may be generated so as to cover the entire work area 72 in the field 70, for example. Along the target path shown in FIG. 7, the work vehicle 100 automatically travels while repeating a reciprocating motion from a beginning point of work to an ending point of work. Note that the target path shown in FIG. 7 is merely an example, and the target path may be arbitrarily determined.

Now, an example control by the controller 180 during self-driving inside the field will be described.

Figure 8:
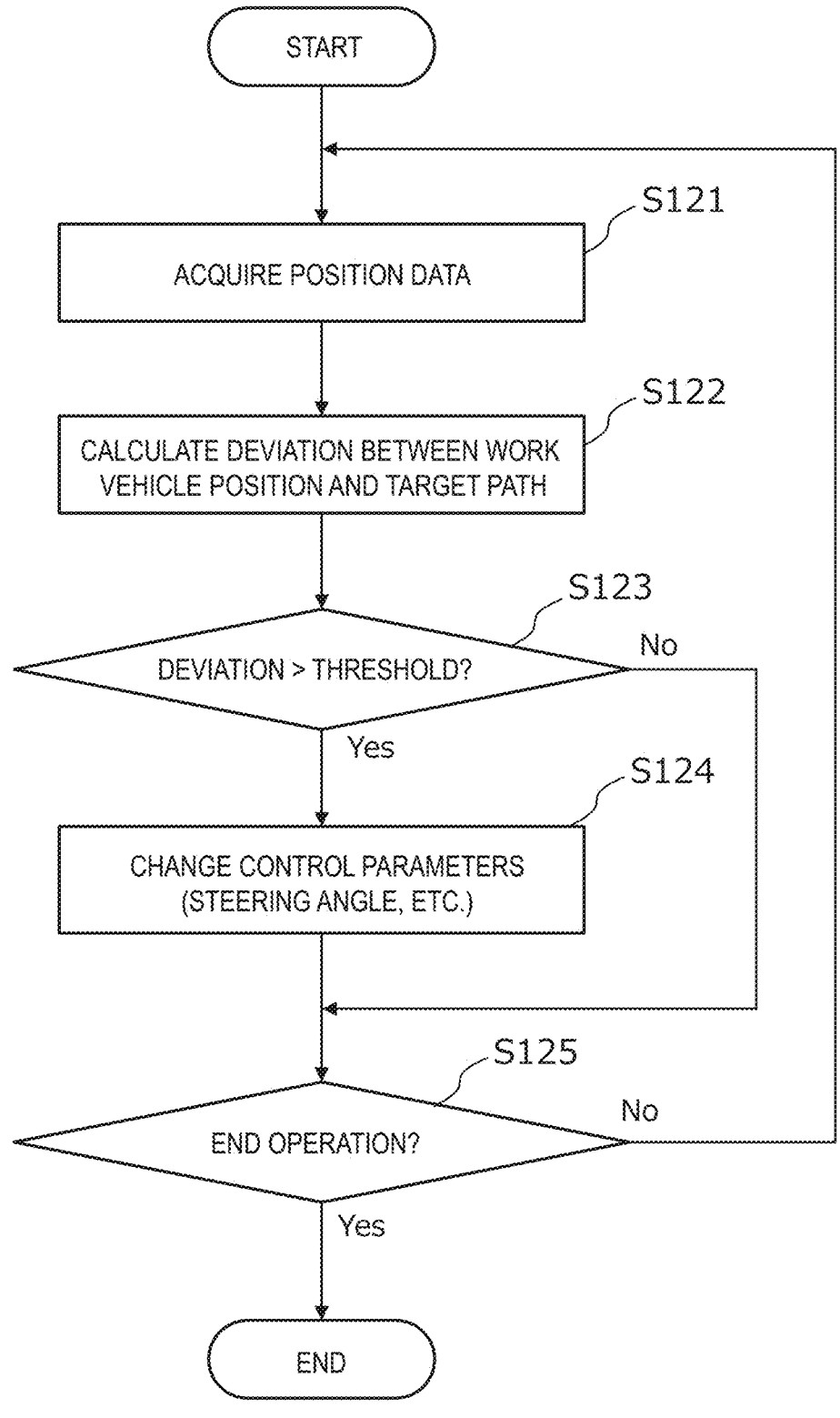
FIG. 8 is a flowchart showing an example operation of steering control during self-driving.

FIG. 8 is a flowchart showing an example operation of steering control to be performed by the controller 180 during self-driving. During travel of the work vehicle 100, the controller 180 performs automatic steering by performing the operation from steps S121 to S125 shown in FIG. 8. The speed of the work vehicle 100 will be maintained at a previously-set speed, for example. First, during travel of the work vehicle 100, the controller 180 acquires data representing the position of the work vehicle 100 that is generated by the GNSS unit 110 (step S121). Next, the controller 180 calculates a deviation between the position of the work vehicle 100 and the target path (step S122). The deviation represents the distance between the position of the work vehicle 100 and the target path at that moment. The controller 180 determines whether the calculated deviation in position exceeds the previously-set threshold or not (step S123). If the deviation exceeds the threshold, the controller 180 changes a control parameter of the steering device included in the drive device 240 so as to reduce the deviation, thus changing the steering angle (step S124). If the deviation does not exceed the threshold at step S123, the operation of step S124 is omitted. At the following step S125, the controller 180 determines whether a command to end the operation has been received or not. The command to end the operation may be given when the user has instructed that self-driving be suspended through remote operations, or when the work vehicle 100 has arrived at the destination, for example. If the command to end the operation has not been given, the control returns to step S121 and the controller 180 performs substantially the same operation based on a newly measured position of the work vehicle 100. The controller 180 repeats the operation from steps S121 to S125 until a command to end the operation is given. The aforementioned operation is executed by the ECUs 182 and 184 in the controller 180.

In the example shown in FIG. 8, the controller 180 controls the drive device 240 based only on the deviation between the position of the work vehicle 100 as identified by the GNSS unit 110 and the target path. Alternatively, a deviation in terms of directions may further be considered in the control. For example, when a directional deviation exceeds a previously-set threshold, where the directional deviation is an angle difference between the orientation of the work vehicle 100 as identified by the GNSS unit 110 and the direction of the target path, the controller 180 may change the control parameter of the steering device of the drive device 240 (e.g., steering angle) in accordance with the deviation.

Hereinafter, with reference to FIGS. 9A to 9D, an example of steering control by the controller 180 will be described more specifically.

Figure 9A:
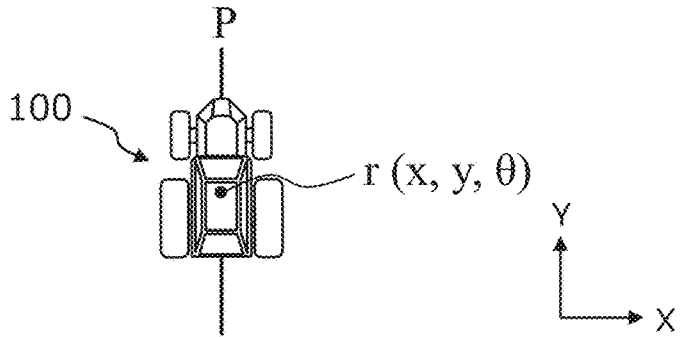
FIG. 9A is a diagram showing an example of the work vehicle traveling along a target path P.
Figure 9B:
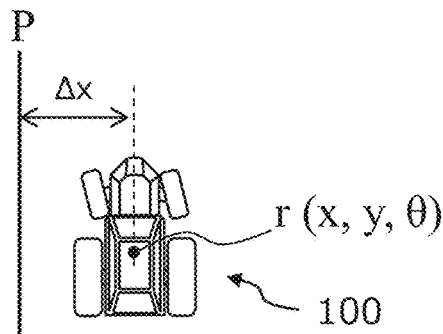
FIG. 9B is a diagram showing an example of the work vehicle at a position which is shifted rightward from the target path P.
Figure 9C:
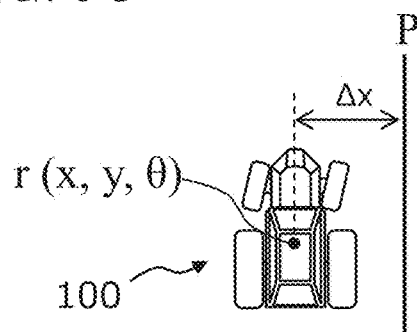
FIG. 9C is a diagram showing an example of the work vehicle at a position which is shifted leftward from the target path P.
Figure 9D:
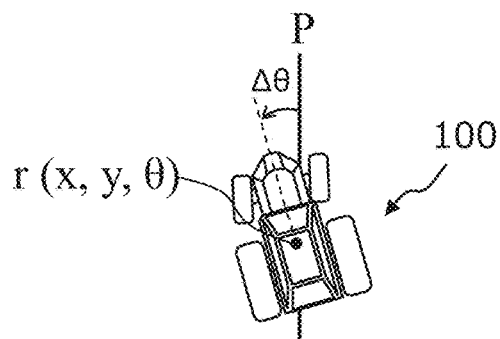
FIG. 9D is a diagram showing an example of the work vehicle oriented in an inclined direction with respect to the target path P.

FIG. 9A is a diagram showing an example of the work vehicle 100 traveling along a target path P. FIG. 9B is a diagram showing an example of the work vehicle 100 at a position which is shifted rightward from the target path P. FIG. 9C is a diagram showing an example of the work vehicle 100 at a position which is shifted leftward from the target path P. FIG. 9D is a diagram showing an example of the work vehicle 100 oriented in an inclined direction with respect to the target path P. In these figures, the pose, i.e., the position and orientation, of the work vehicle 100 as measured by the GNSS unit 110 is expressed as r (x, y, $\theta$). Herein, (x, y) are coordinates representing the position of a reference point on the work vehicle 100 in an XY coordinate system, which is a two-dimensional coordinate system fixed to the globe. In the examples shown in FIGS. 9A to 9D, the reference point on the work vehicle 100 is at a position, on the cabin, where a GNSS antenna is disposed, but the reference point may be at any arbitrary position. $\theta$ is an angle representing the measured orientation of the work vehicle 100. Although the target path P is shown parallel to the Y axis in the examples illustrated in these figures, the target path P may not necessarily be parallel to the Y axis, in general.

As shown in FIG. 9A, in the case where the position and orientation of the work vehicle 100 are not deviated from the target path P, the controller 180 maintains the steering angle and speed of the work vehicle 100 without changing them.

As shown in FIG. 9B, when the position of the work vehicle 100 is shifted rightward from the target path P, the controller 180 changes the steering angle so that the traveling direction of the work vehicle 100 will be inclined leftward, thus bringing the work vehicle 100 closer to the path P. At this point, not only the steering angle but also speed may be changed. The magnitude of the steering angle may be adjusted in accordance with the magnitude of a positional deviation $\Delta x$, for example.

As shown in FIG. 9C, when the position of the work vehicle 100 is shifted leftward from the target path P, the controller 180 changes the steering angle so that the traveling direction of the work vehicle 100 will be inclined rightward, thus bringing the work vehicle 100 closer to the path P. In this case, too, not only the steering angle but also the speed may be changed. The amount of change of the steering angle may be adjusted in accordance with the magnitude of the positional deviation $\Delta x$, for example.

US 12,687,640 B2

21

As shown in FIG. 9D, in the case where the position of the work vehicle 100 is not considerably deviated from the target path P but its orientation is nonetheless different from the direction of the target path P, the controller 180 changes the steering angle so that the directional deviation Δθ will become smaller. In this case, too, not only the steering angle but also the speed may be changed. The magnitude of the steering angle may be adjusted in accordance with the magnitudes of the positional deviation Δx and the directional deviation Δθ, for example. For instance, the amount of change of the steering angle (which is in accordance with the directional deviation Δθ) may be increased as the absolute value of the positional deviation Δx decreases. When the positional deviation Δx has a large absolute value, the steering angle will be changed greatly in order for the work vehicle 100 to return to the path P, so that the directional deviation Δθ will inevitably have a large absolute value. Conversely, when the positional deviation Δx has a small absolute value, the directional deviation Δθ needs to become closer to zero. Therefore, it may be advantageous to introduce a relatively large weight (i.e., control gain) for the directional deviation Δθ in determining the steering angle.

For the steering control and speed control of the work vehicle 100, control techniques such as PID control or MPC (Model Predictive Control) may be applied. Applying these control techniques will make for smoothness of the control of bringing the work vehicle 100 closer to the target path P.

Note that, when an obstacle is detected by sensing devices such as the cameras 120, the obstacle sensors 130 and the LiDAR sensor 140 during travel, the controller 180 halts the work vehicle 100. At this point, the controller 180 may cause the buzzer 220 to present an alarm sound or may transmit an alert signal to the terminal device 400. In the case where obstacle is avoidable, the controller 180 may control the drive device 240 such that the obstacle is avoided.

The work vehicle 100 according to the present example embodiment can perform self-traveling outside a field as well as inside the field. Outside the field, the processing unit 161 and/or the controller 180 is able to detect objects around the work vehicle 100 (e.g., another vehicle, a pedestrian, etc.) based on data output from sensing devices such as the cameras 120, the obstacle sensors 130 and the LiDAR sensor 140. Using the cameras 120 and the LiDAR sensor 140 enables detection of an object located at a relatively distant position from the work vehicle 100. The controller 180 performs speed control and steering control such that the work vehicle 100 avoids the detected object, thereby realizing self-traveling on a road outside the field.

Figure 10:
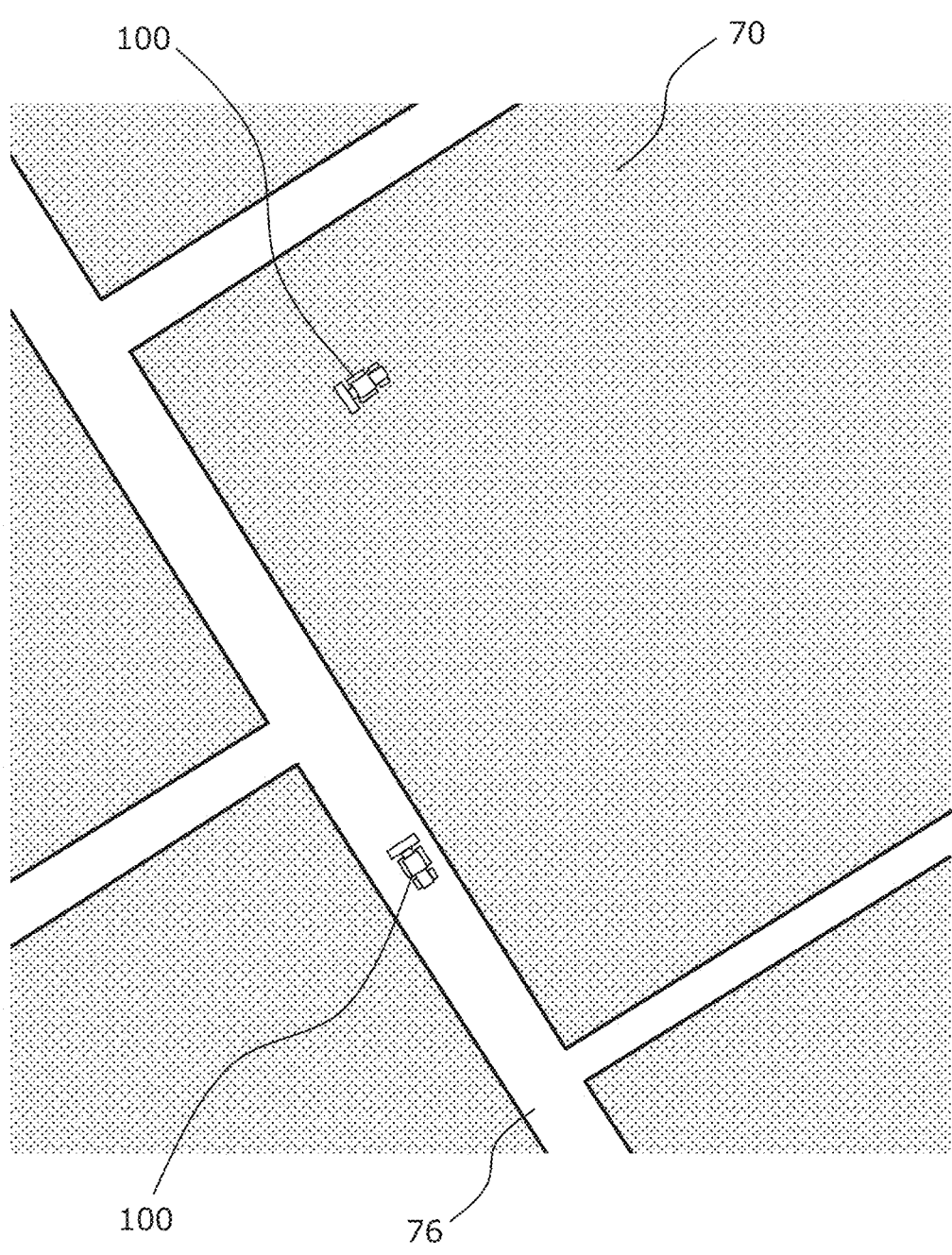
FIG. 10 is a diagram schematically showing an example of state where a plurality of the work vehicles perform self-traveling inside a field and on a road outside the field.

As described above, the work vehicle 100 according to the present example embodiment can automatically travel inside the field and outside the field in an unmanned manner. FIG. 10 is a diagram schematically showing an example of state where a plurality of the work vehicles 100 are performing self-traveling inside a field 70 and on a road 76 outside the field 70. In the storage 170, an environment map of a region including a plurality of fields 70 and roads around the fields 70, and a target path, are recorded. The environment map and the target path may be generated by the management device 600 or the ECU 185. In the case of traveling on a road, the work vehicle 100 travels along the target path while sensing the surroundings thereof by use of the sensing devices such as the cameras 120, the obstacle sensors 130 and the LiDAR sensor 140, with the implement 300 being raised.

[2-2. Setting of Search Regions in Accordance with the Area in which an Agricultural Machine is Located]

Next, the process of setting search regions in accordance with the area in which an agricultural machine is located is described.

As previously described, the sensing devices, such as cameras 120, obstacle sensors 130 and LiDAR sensor 140, sense an environment around the work vehicle 100 to output sensing data. The processing unit 161 (FIG. 3) detects objects in search regions around the work vehicle 100 based on the sensing data. The search region refers to a portion of a region sensed by the sensing devices around the work vehicle 100 in which a search for objects is to be conducted. The search regions may be equal in size to, or may be smaller than, the sensing regions sensed by the sensing devices. The search region can also be referred to as Region of Interest (ROI).

In example embodiments which will be described below, in the process of detecting objects using the sensing data output from the LiDAR sensor 140, the pattern of the search regions is changed in accordance with the area in which the work vehicle 100 is located. The change of the pattern of the search regions refers to, for example, changing at least one of the shape and size of the search regions and the location of the search regions relative to the work vehicle 100.

The work vehicle 100 of the present example embodiment includes a sensing system 10 (FIG. 3) to detect objects around the work vehicle 100 using the sensing data output from the LiDAR sensor 140. The sensing system 10 includes a processor 161 and LiDAR sensor 140. In the case of detecting the area in which the work vehicle 100 is located using the position data and the map data produced by the GNSS unit 110, the sensing system 10 can include the GNSS unit 110 and the storage 170. In the case of estimating the area in which the work vehicle 100 is located by matching between data output from the cameras 120 and an environment map, the sensing system 10 can include the cameras 120 and the storage 170.

The LiDAR sensor 140 is capable of sequentially emitting pulses of a laser beam (hereinafter, abbreviated as "laser pulses") while changing the direction of emission and measuring the distance to a point of reflection of each laser pulse based on the difference between the time of emission of each laser pulse and the time of reception of reflection of the laser pulse. The "point of reflection" can be an object in an environment around the work vehicle 100.

The LiDAR sensor 140 can measure the distance from the LiDAR sensor 140 to an object by an arbitrary method. Examples of the measurement method of the LiDAR sensor 140 include mechanical rotation, MEMS, and phased array type measurement methods. These measurement methods are different in the method of emitting laser pulses (the method of scanning). For example, the mechanical rotation type LiDAR sensor rotates a cylindrical head, which is for emitting laser pulses and detecting reflection of the laser pulses, to scan the surrounding environment in all directions, i.e., 360 degrees, around the axis of rotation. The MEMS type LiDAR sensor uses a MEMS mirror to oscillate the emission direction of laser pulses and scans the surrounding environment in a predetermined angular range centered on the oscillation axis. The phased array type LiDAR sensor controls the phase of light to oscillate the emission direction of the light and scans the surrounding environment in a predetermined angular range centered on the oscillation axis.

Figure 11:
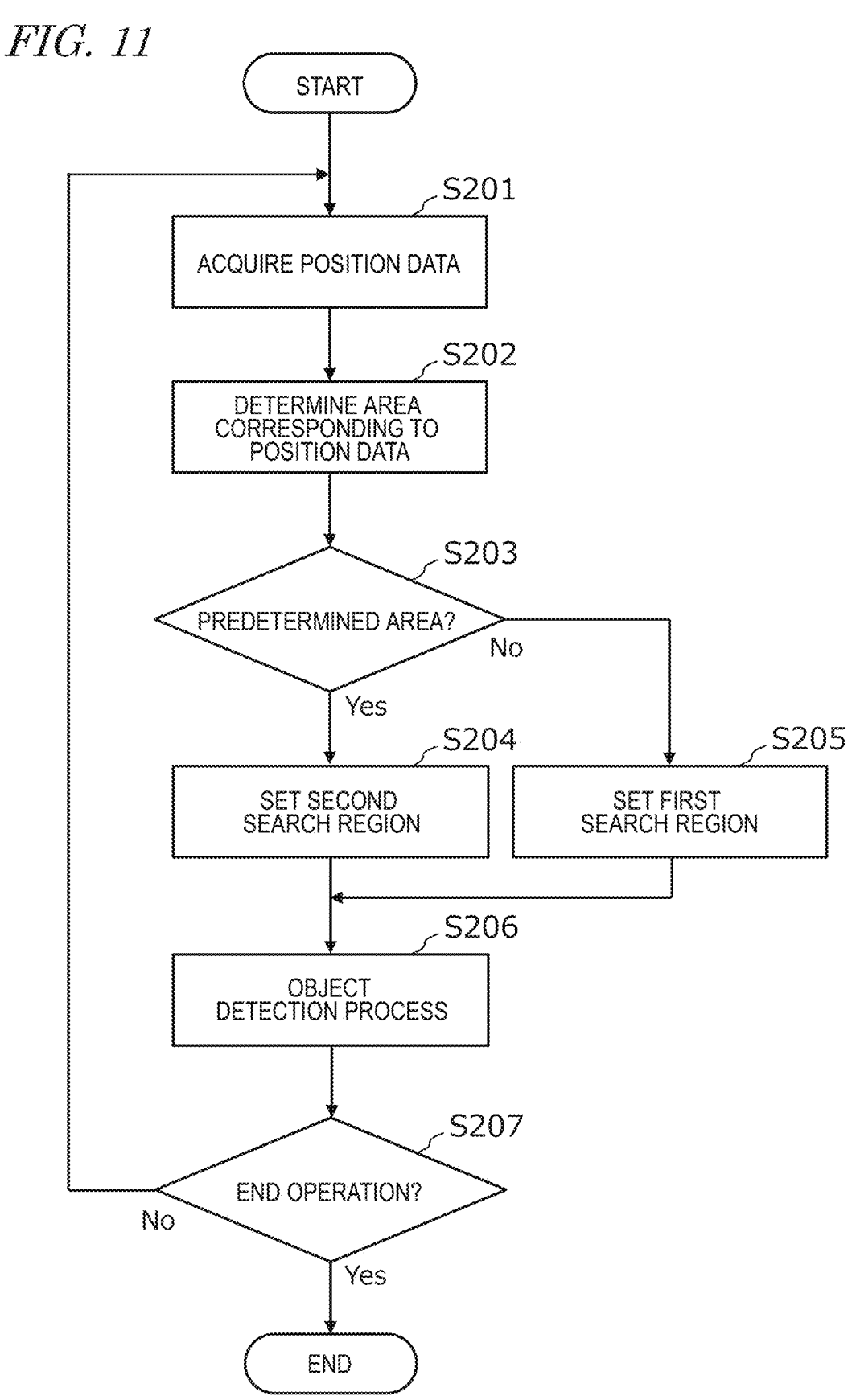
FIG. 11 is a flowchart showing an example of the process of changing the pattern of search regions in accordance with the area in which an agricultural machine is located.

FIG. 11 is a flowchart showing an example of the process of changing the pattern of the search regions in accordance with the area in which the agricultural machine is located.

Similarly to the process of Step S121 (FIG. 8) that has previously been described, the controller 180 (FIG. 3) is configured or programmed to acquire position data indicative of the position of the work vehicle 100, which is generated by the GNSS unit 110 during the travel of the work vehicle 100 (Step S201). The position data includes the information on the geographic coordinates of the position of the work vehicle 100. The storage 170 stores map data concerning the area in which the work vehicle 100 travels. The map data includes the information on the geographic coordinates of the area indicated by the map.

The processor 161 uses the map data to determine the area corresponding to the geographic coordinates indicated by the position data (Step S202). The area corresponding to the geographic coordinates indicated by the position data corresponds to the area in which the work vehicle 100 is located. The processor 161 determines whether or not the area corresponding to the geographic coordinates indicated by the position data is a predetermined area (Step S203). The predetermined area is registered in the map data in advance.

If the area corresponding to the geographic coordinates indicated by the position data is not the predetermined area, the processor 161 sets the first search region as the search region (Step S205). If the area corresponding to the geographic coordinates indicated by the position data is the predetermined area, the processor 161 sets the second search region as the search region (Step S204).

Figure 12:
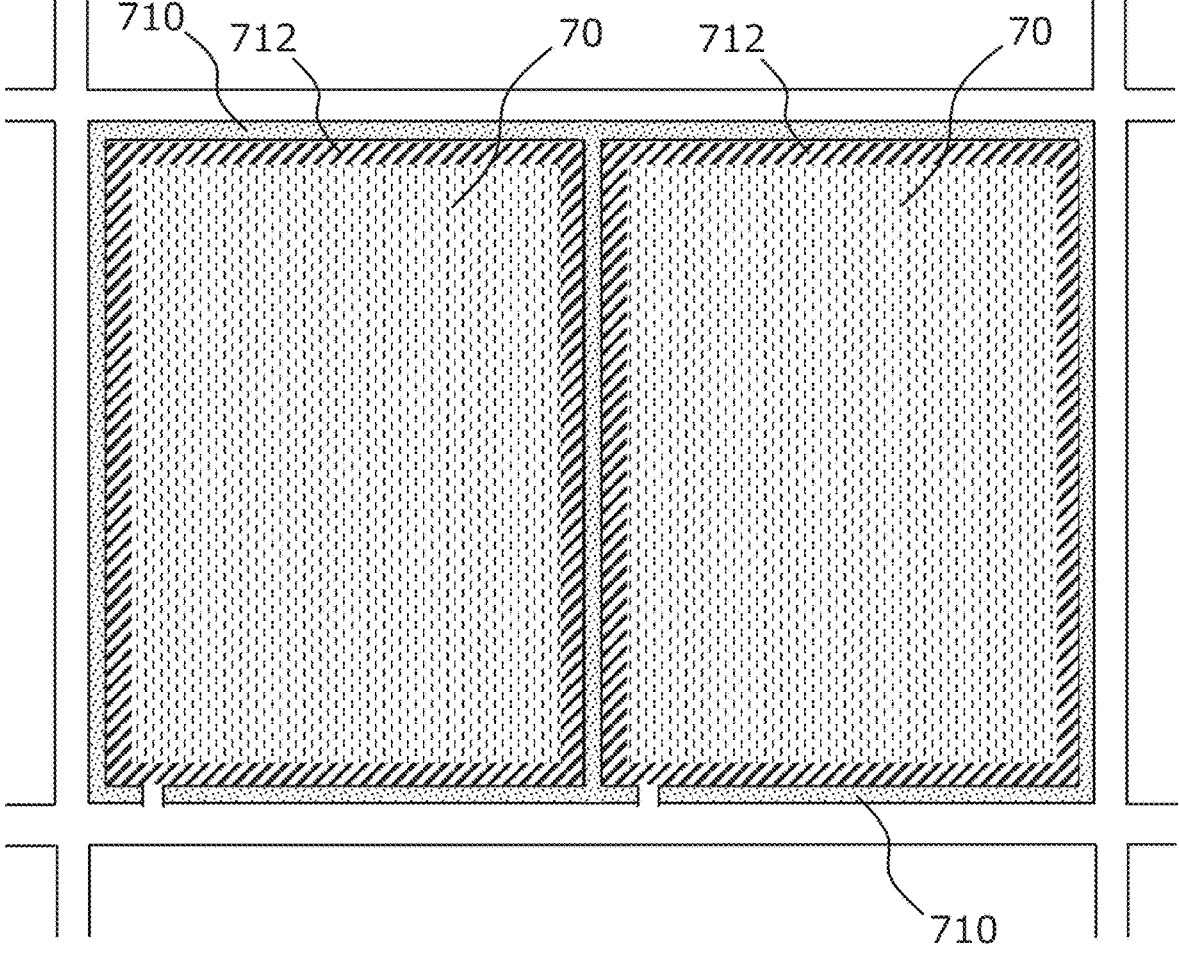
FIG. 12 shows an example of the area in which the pattern of search regions is changed.

FIG. 12 shows an example of the area in which the pattern of the search regions is changed. In the example shown in FIG. 12, the predetermined area is an area 712 near the outer boundary portion of the field 70. In FIG. 12, the area 712 is shown by shaded hatching. In the example shown in FIG. 12, embankments 710 are formed in the outer boundary portion of the field 70. In this case, the area 712 can be an embankment edge area. Note that the fields in which embankments are formed are not limited to paddy fields.

Figure 13:
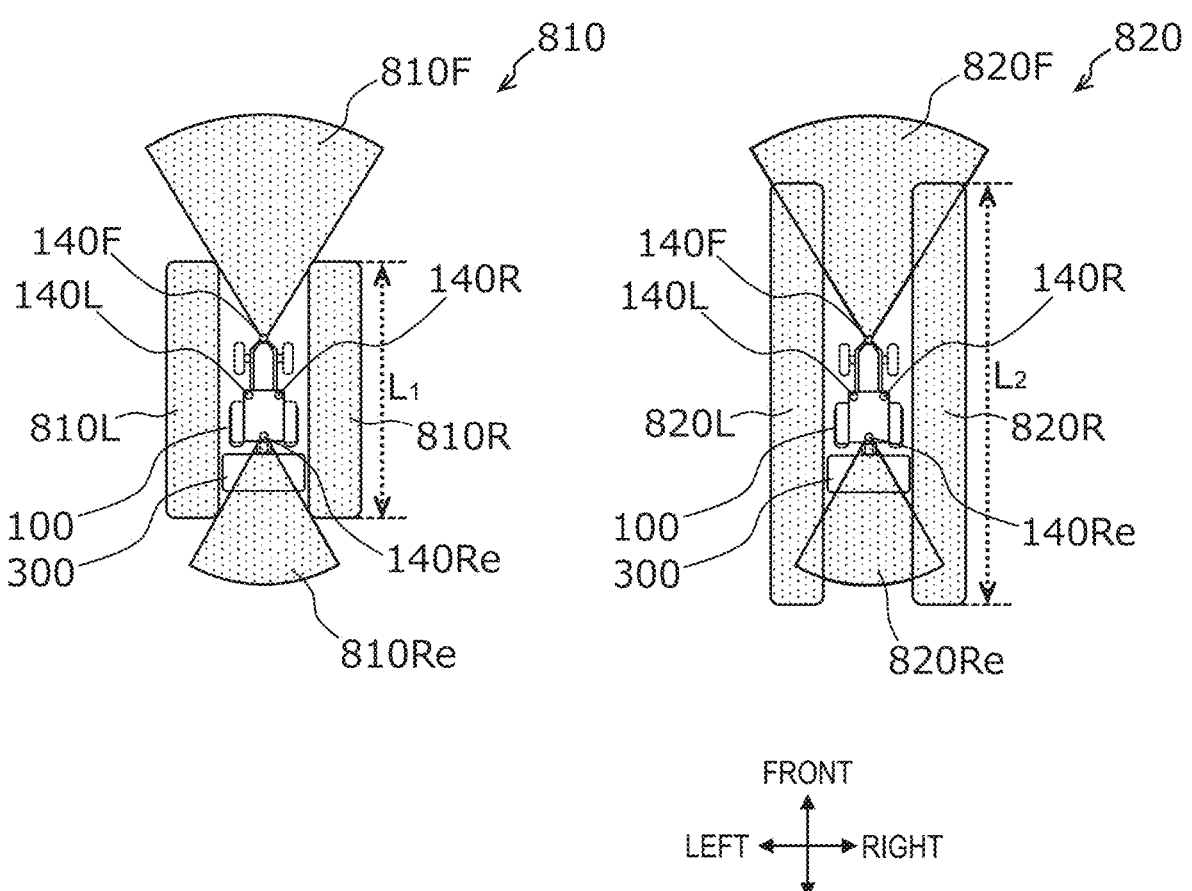
FIG. 13 shows an example of the first search region and the second search region.

FIG. 13 shows an example of the first search region and the second search region. The first search region 810 is a search region that is to be set if the position of the work vehicle 100 is not in a predetermined area. The second search region 820 is a search region that is to be set if the position of the work vehicle 100 is in the predetermined area.

The first search region 810 includes a front search region 810F, a rear search region 810Re, a left lateral search region 810L, and a right lateral search region 810R. The second search region 820 includes a front search region 820F, a rear search region 820Re, a left lateral search region 820L, and a right lateral search region 820R. FIG. 13 shows the search regions as viewed in plan from a vertical direction while the work vehicle 100 is on horizontal ground. In the present example embodiment, the pattern of the search regions as viewed in plan from a vertical direction is changed.

In this example, the work vehicle 100 has four LiDAR sensors 140F, 140Re, 140L, 140R. The LiDAR sensor 140F is provided in the front-side portion of the work vehicle 100 to mainly sense a portion of the surrounding environment extending on the front side of the work vehicle 100. The LiDAR sensor 140Re is provided in the rear-side portion of the work vehicle 100 to mainly sense a portion of the surrounding environment extending on the rear side of the work vehicle 100. The LiDAR sensor 140L is provided in the left-side portion of the work vehicle 100 to mainly sense a portion of the surrounding environment extending on the left side of the work vehicle 100. The LiDAR sensor 140R is provided in the right-side portion of the work vehicle 100 to mainly sense a portion of the surrounding environment extending on the right side of the work vehicle 100. The LiDAR sensors 140Re, 140L, 140R can be provided in, for example, the cabin 105 of the work vehicle 100 (FIG. 2). The LiDAR sensor 140Re may be provided in the implement 300.

Figure 14:
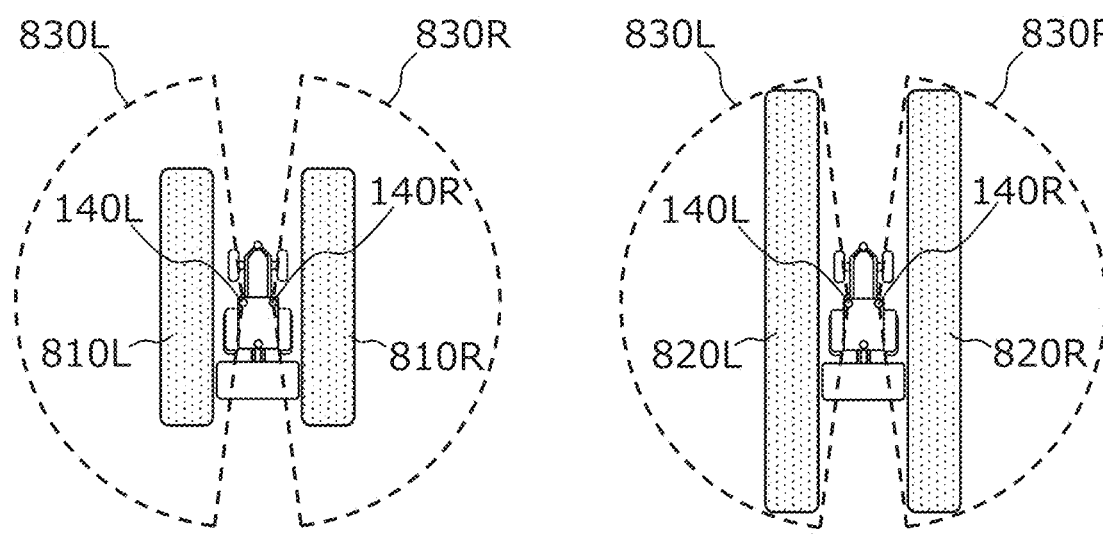
FIG. 14 shows the relationship between sensing regions sensed by LiDAR sensors and search regions in which a search for objects is to be conducted.
Figure 14:
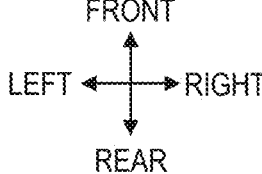
Figure 15:
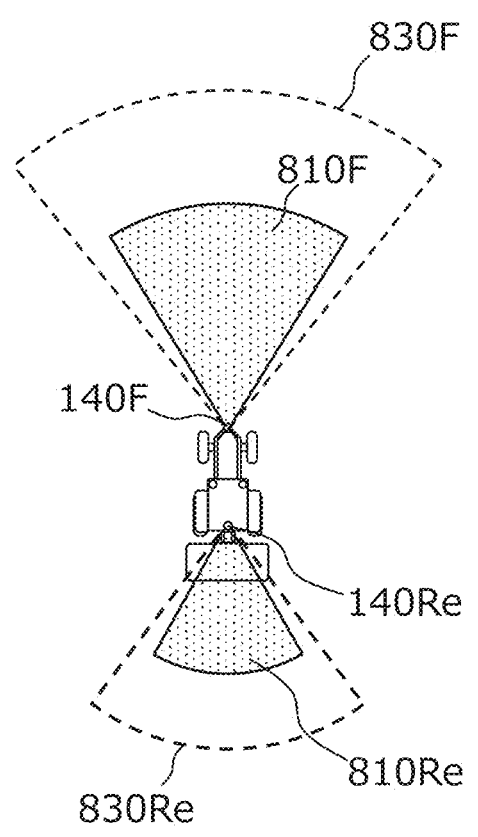
FIG. 15 shows the relationship between sensing regions sensed by LiDAR sensors and search regions in which a search for objects is to be conducted.
Figure 15:
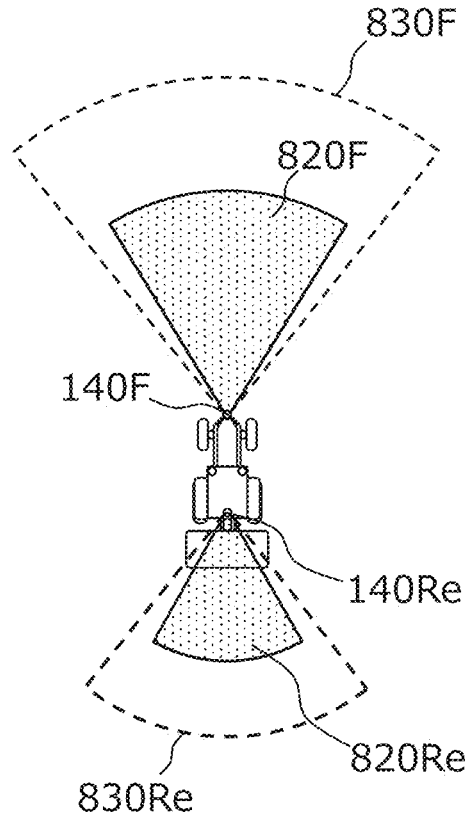
Figure 15:
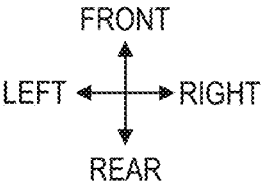

FIG. 14 and FIG. 15 show the relationship between sensing regions sensed by LiDAR sensors and search regions in which a search for objects is to be conducted. The shape, size, and position of the search regions can be realized by, for example, changing a portion of the three-dimensional point cloud data output by the LiDAR sensors which is to be used in search for objects.

The three-dimensional point cloud data output by the LiDAR sensors includes the information about the position of a plurality of points and the information such as the reception intensity of a photodetector (attribute information). The information about the position of a plurality of points is, for example, the information about the emission direction of laser pulses corresponding to the points and the distance between the LiDAR sensors and the points. For example, the information about the position of a plurality of points is the information about the coordinates of the points in a local coordinate system. The local coordinate system is a coordinate system that moves together with the work vehicle 100 and is also referred to as sensor coordinate system. The coordinates of each point can be calculated from the emission direction of laser pulses corresponding to the points and the distance between the LiDAR sensors and the points.

For example, the search region can be set based on the coordinates of each of the points. By selecting points located inside a desired shape in a local coordinate system as points which are to be used in search for objects, the search region of the desired shape can be set.

FIG. 14 shows the sensing region 830L sensed by the LiDAR sensor 140L and the sensing region 830R sensed by the LiDAR sensor 140R.

The search region 810L can be set by selecting points located inside a predetermined shape in a local coordinate system from a plurality of points indicated by the three-dimensional point cloud data output by the LiDAR sensor 140L. The search region 820L can be set by selecting points located inside another shape in the local coordinate system.

The search region 810R can be set by selecting points located inside a predetermined shape in a local coordinate system from a plurality of points indicated by the three-dimensional point cloud data output by the LiDAR sensor 140R. The search region 820R can be set by selecting points located inside another shape in the local coordinate system.

In the example shown in FIG. 14, the search regions 810L, 810R, 820L, 820R have a generally rectangular shape, although not limited thereto, but may have a different shape.

FIG. 15 shows the sensing region 830F sensed by the LiDAR sensor 140F and the sensing region 830Re sensed by the LiDAR sensor 140Re.

The search region 810F can be set by selecting points located inside a predetermined shape in a local coordinate system from a plurality of points indicated by the three-dimensional point cloud data output by the LiDAR sensor 140F. The search region 820F can be set by selecting points located inside another shape in the local coordinate system.

The search region 810Re can be set by selecting points located inside a predetermined shape in a local coordinate system from a plurality of points indicated by the three-dimensional point cloud data output by the LiDAR sensor 140Re. The search region 820Re can be set by selecting points located inside another shape in the local coordinate system.

In the example shown in FIG. 15, the search regions 810F, 810Re, 820F, 820Re are generally in the shape of a fan, although not limited thereto, but may have a different shape. In the example shown in FIG. 15, the search region 810F and the search region 820F can be equal to each other but may be different from each other. Likewise, in the example shown in FIG. 15, the search region 810Re and the search region 820Re can be equal to each other but may be different from each other.

As shown in FIG. 13, the length $L_2$ in the longitudinal direction of the lateral search regions 820L and 820R is greater than the length $L_1$ in the longitudinal direction of the lateral search regions 810L and 810R. When the work vehicle 100 is traveling in the embankment edge area 712 (FIG. 12) in the field 70, it is desirable that the state on the lateral sides of the work vehicle 100 be detectable in an early phase. The lateral search regions 820L and 820R are set to have a greater length in the longitudinal direction in the case where the work vehicle 100 is traveling in the embankment edge area 712 than in the case where the work vehicle 100 is traveling in an area other than the embankment edge area 712 (for example, an area relatively distant from the outer boundary portion in the field 70), so that the state on the lateral sides of the work vehicle 100 can be detectable in an early phase.

Note that, as the points in the lateral search regions which are to be objects of search, the points indicated by the three-dimensional point cloud data output by the LiDAR sensor 140F and/or the LiDAR sensor 140Re may be included.

Figure 16:
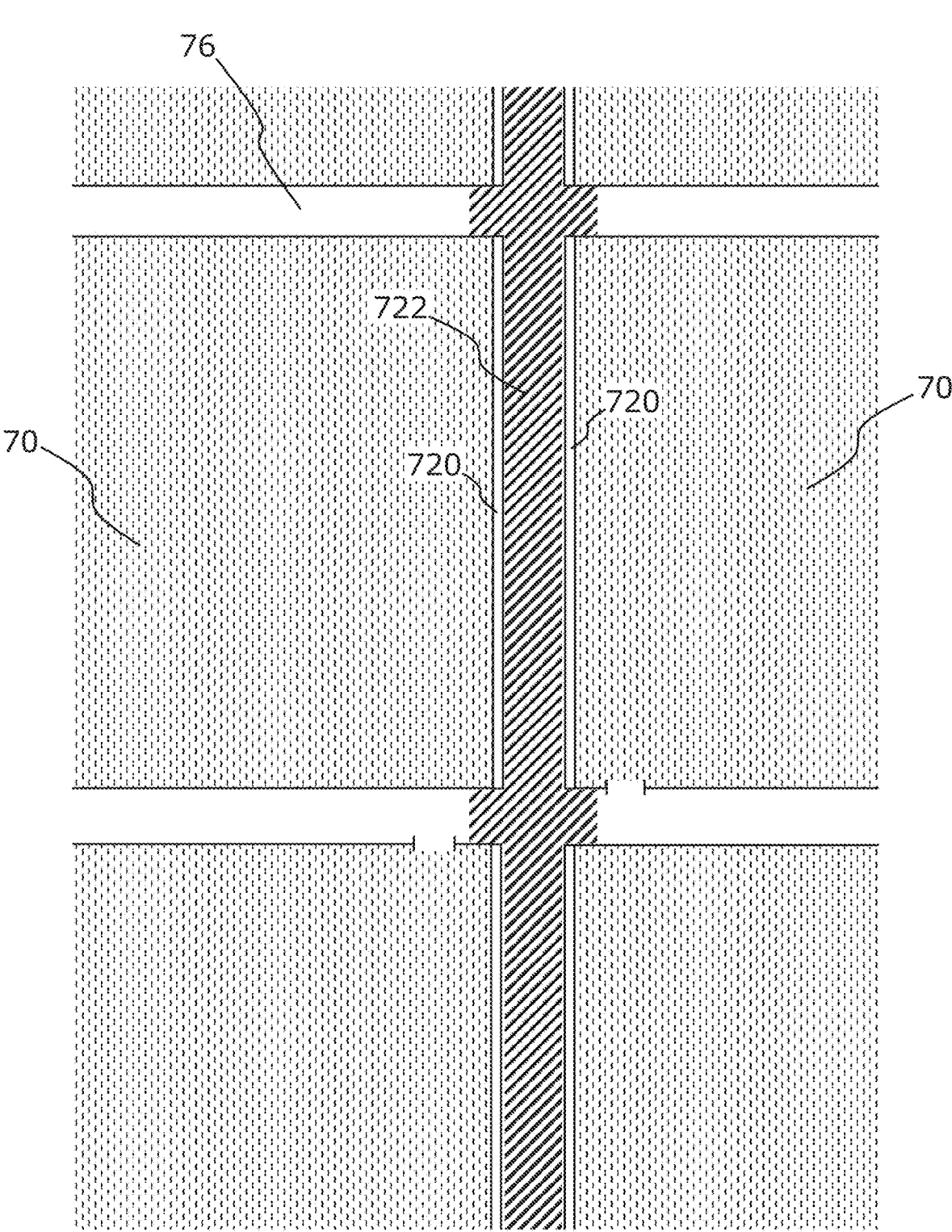
FIG. 16 shows another example of the area in which the pattern of the search regions is changed.

FIG. 16 shows another example of the area in which the pattern of the search regions is changed. In the example shown in FIG. 16, the predetermined area in which the pattern of the search regions is changed is an area 722 of the roads 76 outside the fields (farm roads or public roads) which is adjacent to water paths 720. In FIG. 16, the area 722 is shown by shaded hatching. When the work vehicle 100 is traveling in the area 722 that is adjacent to the water paths, it is desirable that the state on the lateral sides of the work vehicle 100 be detectable in an early phase. The lateral search regions 820L and 820R are set to have a greater length in the longitudinal direction in the case where the work vehicle 100 is traveling in the area 722 that is adjacent to the water paths than in the case where the work vehicle 100 is traveling in the roads 76 other than the area 722 that is adjacent to the water paths, so that the state on the lateral sides of the work vehicle 100 can be detectable in an early phase.

As shown in FIG. 11, the processor 161 detects objects around the work vehicle 100 using the output data of the LiDAR sensor 140 corresponding to the set search region (Step S206). The processor 161 repeats the operations of Step S201 to Step S206 till it is ordered to end the operations (Step S207).

Figure 17:
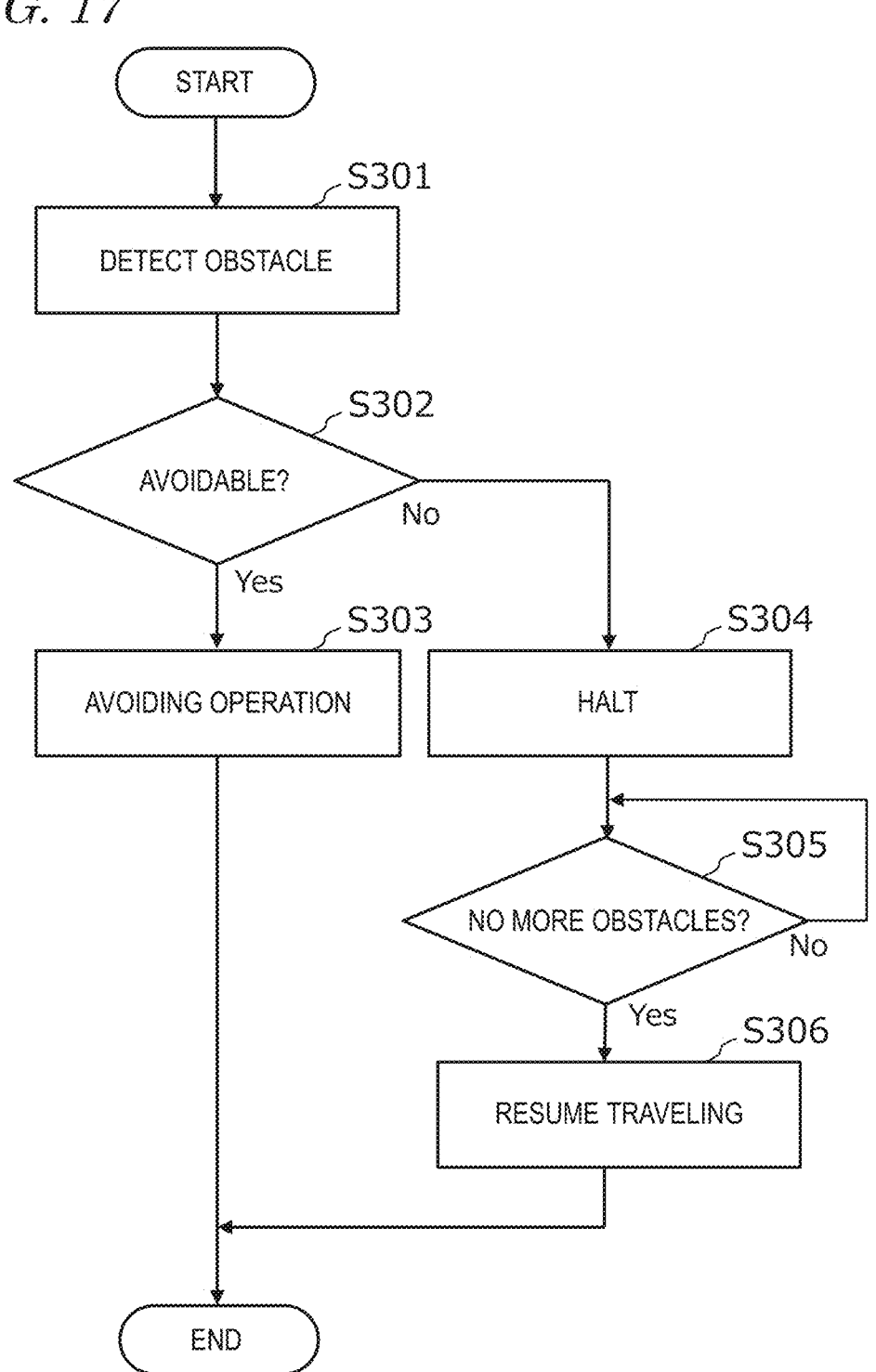
FIG. 17 is a flowchart showing an example of the process performed upon detection of an obstacle.

If an obstacle is detected in the process of detecting objects around the work vehicle 100, the work vehicle 100 can perform an action to avoid the obstacle or halt traveling. FIG. 17 is a flowchart showing an example of the process performed upon detection of an obstacle.

For example, if an object such as a human, animal, or vehicle located on a preset target path is detected, the processor 161 determines that there is an obstacle (Step S301). For example, if an object which is not included in a pre-generated "environment map" and which is taller than a predetermined height is detected on the target path, the processor 161 determines that there is an obstacle.

If an obstacle is detected, the ECU 185 determines whether or not it is possible to generate such a detour route that the work vehicle 100 can avoid the obstacle (Step S302). For example, if there is a sufficient space on the roads 76 to make a detour, the ECU 185 determines that it is possible to generate a detour route. In the field 70, for example, if it is possible to generate a such detour route that the work vehicle 100 will not affect agricultural work and crops, the ECU 185 determines that it is possible to generate a detour route. For example, if it is agricultural work for which generation of a detour route is prohibited in advance, or if it is determined that making a detour will cause the work vehicle 100 to come into contact with crops, the ECU 185 determines that it is not possible to generate a detour route. For example, if it is possible to generate such a detour route that the work vehicle 100 will not enter an area of the field 70 in which the work has been done, the ECU 185 determines that it is possible to generate a detour route.

If the ECU 185 determines that it is possible to generate a detour route, the ECU 185 generates a detour route, and the controller 180 controls the work vehicle 100 so as to travel along the detour route (Step S303). After the work vehicle 100 has traveled through the detour route, the controller 180 controls the work vehicle 100 so as to return to the target path, before returning to the process of Step S207 shown in FIG. 11.

If the ECU 185 determines that it is not possible to generate a detour route, the controller 180 controls the work vehicle 100 so as to halt traveling (Step S304). Concurrently, some operations are performed, such as emission of warning sound from the buzzer 220 and transmission of a warning signal to the terminal unit 400.

If an object detected as an obstacle has moved or a worker has removed the obstacle and, as a result, it is determined that the obstacle has been dismissed, the controller 180 is configured or programmed to control the work vehicle 100 so as to resume traveling (Step S305 and Step S306), before returning to the process of Step S207 shown in FIG. 11.

In the above description, the position data generated by the GNSS unit 110 is used in detecting the area in which the work vehicle 100 is located, although it is not limited to this example. For example, the area in which the work vehicle 100 is located may be estimated by matching between the data output from the LiDAR sensor 140 and/or the cameras 120 and the environment map.

Figure 18:
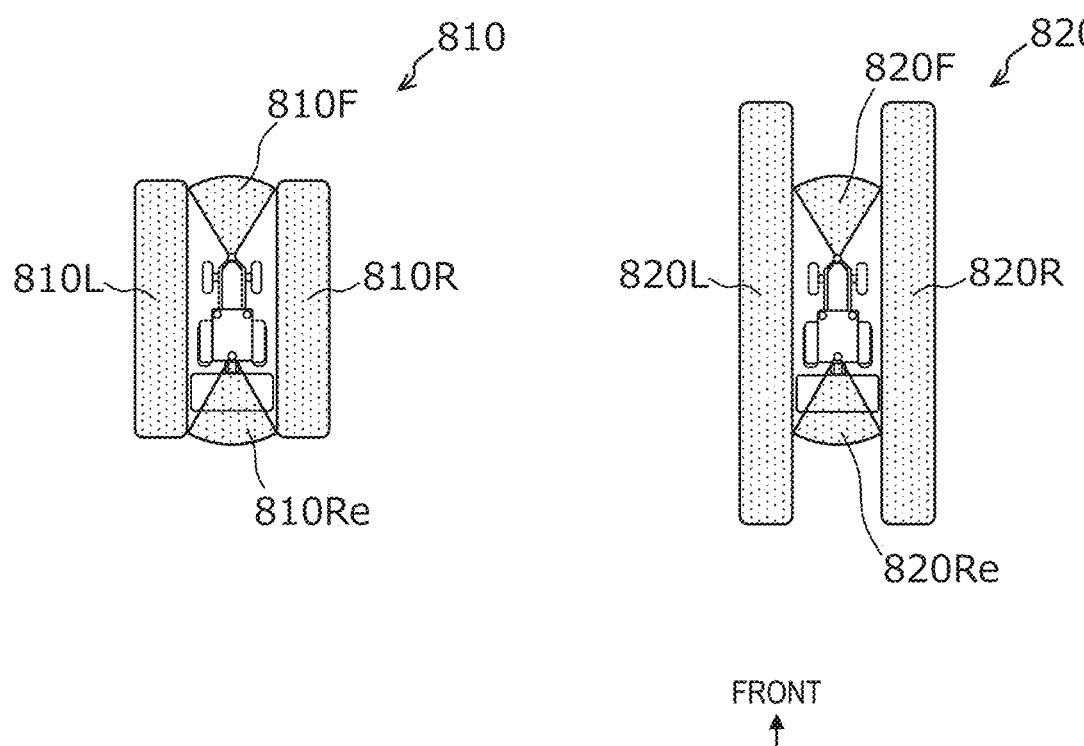
FIG. 18 shows another example of the first search region and the second search region.

FIG. 18 shows another example of the first search region 810 and the second search region 820. In the search regions 810 and 820 shown in FIG. 18, the length in the longitudinal direction of the lateral search regions relative to the front search region and the rear search region is large, as compared with the search regions 810 and 820 shown in FIG. 13. When the lateral search regions have a great length in the longitudinal direction, the state on the lateral sides of the work vehicle 100 is detectable in an early phase.

Figure 19:
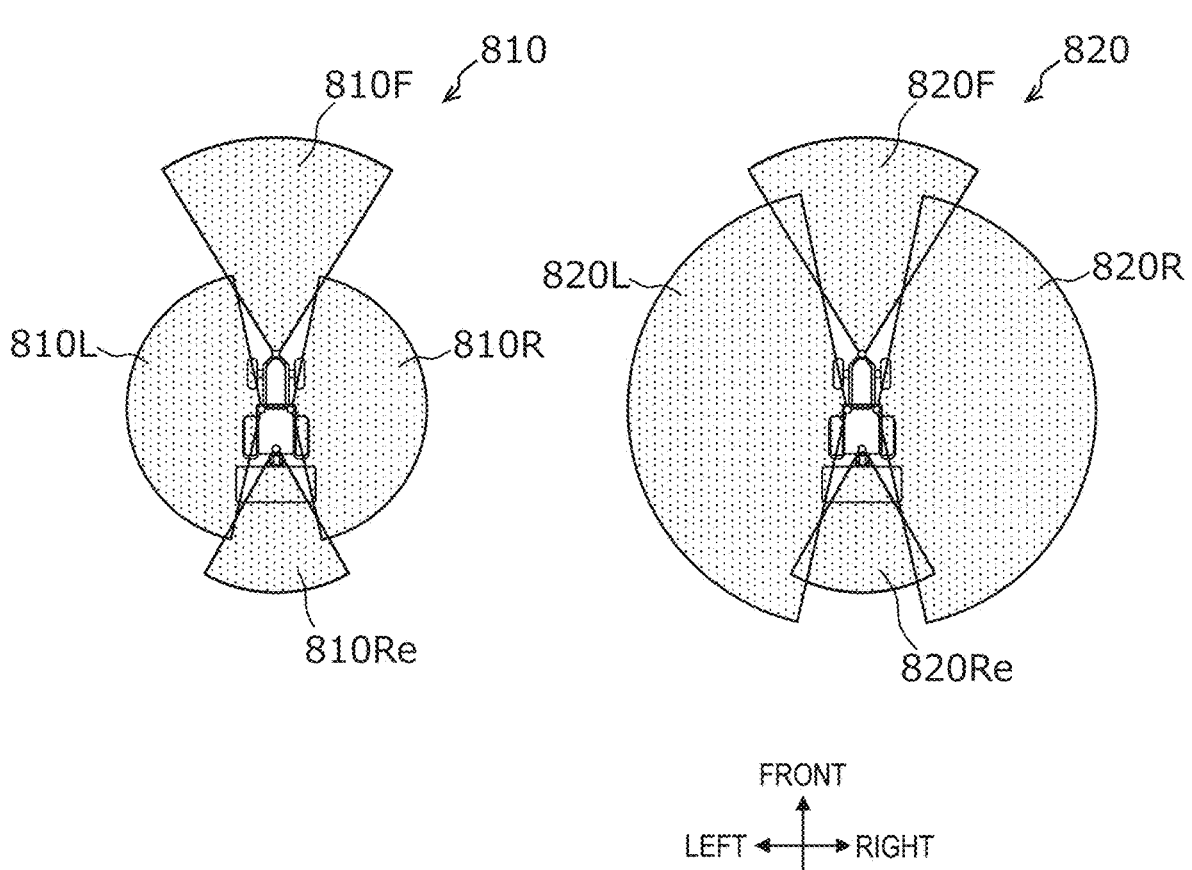
FIG. 19 shows still another example of the first search region and the second search region.

FIG. 19 shows still another example of the first search region 810 and the second search region 820. In the above-described example, the lateral search regions 810L, 810R, 820L, 820R have a generally rectangular shape but may have a different shape. For example, as shown in FIG. 19, the lateral search regions 810L, 810R, 820L, 820R may be generally in the shape of a fan.

As described above, the LiDAR sensor can sense a portion of the surrounding environment within a predetermined angular range centered on the oscillation axis. When the search regions are generally in the shape of a fan, some of a plurality of points indicated by the three-dimensional point cloud data output by the LiDAR sensors which are used in search for objects may be selected in consideration of the emission angle of corresponding laser pulses. By changing the range of the angle which is the criterion for that selection, the pattern of the search regions can be changed. When the search regions are generally in the shape of a fan, some of a plurality of points indicated by the three-dimensional point cloud data which are used in search for objects may be selected in consideration of the distance between the LiDAR sensors and the points. By changing the distance which is the criterion for that selection, the pattern of the search regions can be changed.

The pattern of the search regions may also be changed by changing the range of sensing by the LiDAR sensors. For example, the size of the search regions may be changed by changing the power of laser pulses emitted from the LiDAR sensors. Alternatively, for example, the angular range of the search regions may be changed by changing the angular range in which the LiDAR sensors emit laser pulses. Alternatively, for example, the angular range of the search regions may be changed by changing the angular range in which the emission direction of laser pulses is oscillated.

Figure 20:
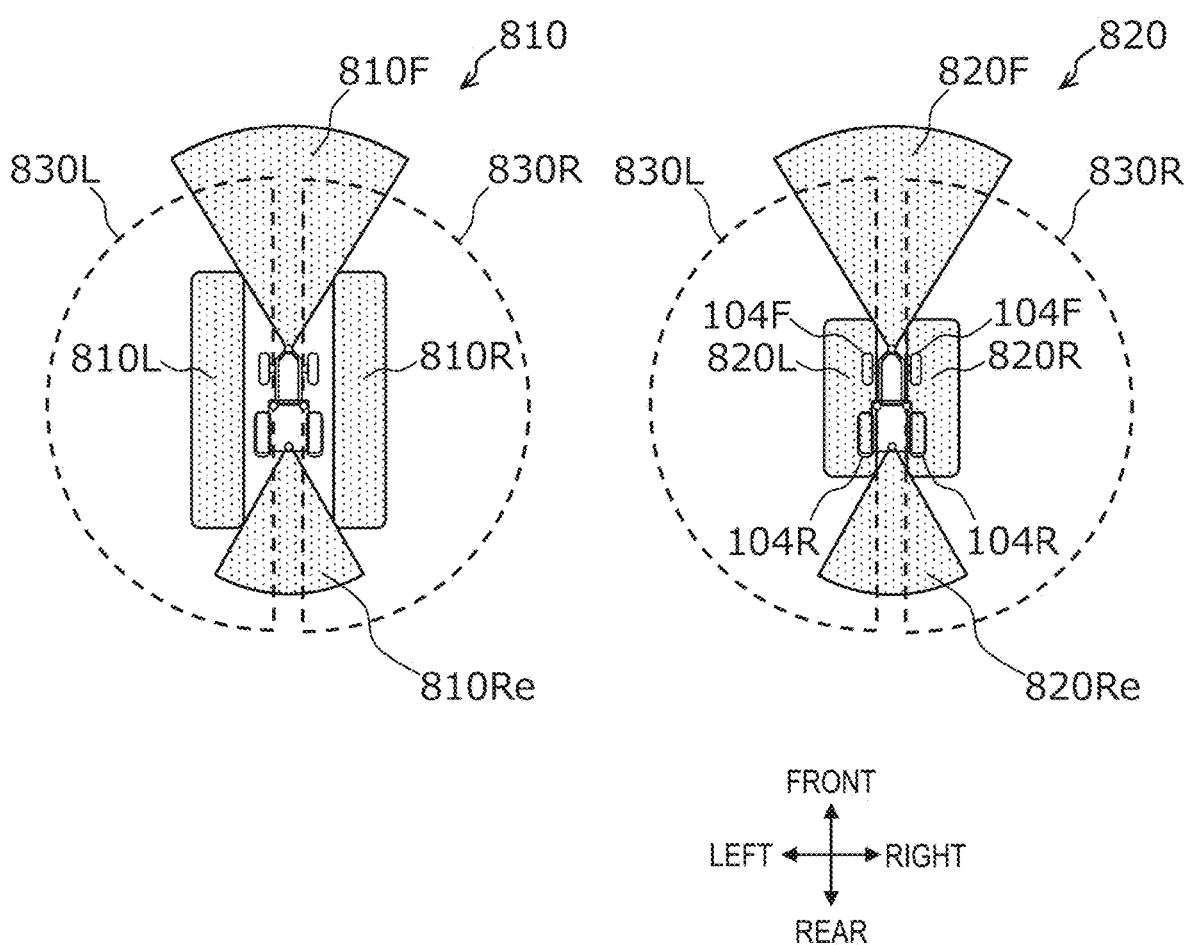
FIG. 20 shows still another example of the first search region and the second search region.

FIG. 20 shows still another example of the first search region 810 and the second search region 820. In the example shown in FIG. 20, the lateral search regions 820L, 820R have such a shape that include regions closer to the front wheels 104F and the rear wheels 104R as compared with the lateral search regions 810L, 810R. Particularly, the lateral search regions 820L, 820R are set to include a region close to the outer edge of the front portion of the front wheels 104F.

Figure 21:
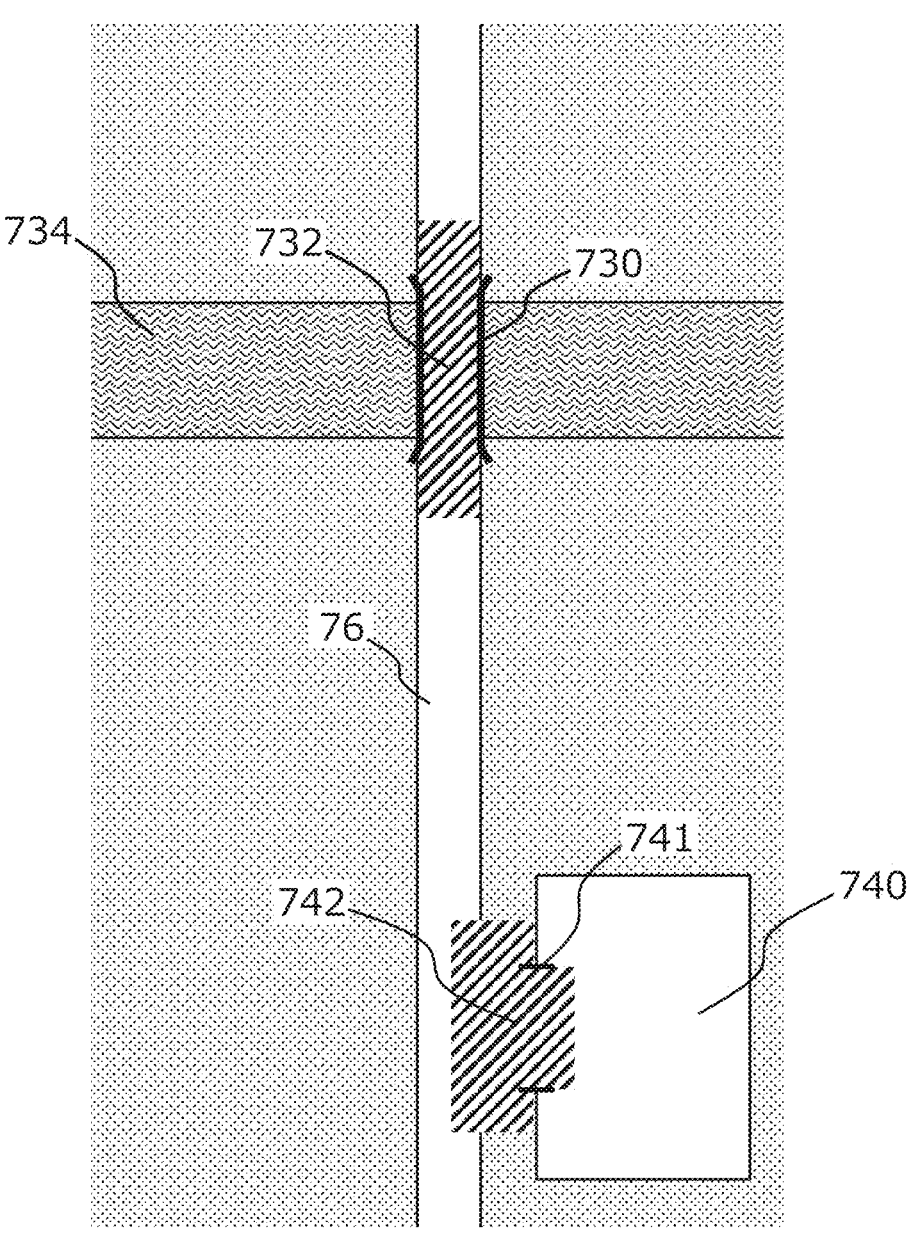
FIG. 21 shows still another example of the area in which the pattern of the search regions is changed.

FIG. 21 shows still another example of the area in which the pattern of the search regions is changed. FIG. 21 shows a bridge area 732 where the pattern of the search regions is changed. The bridge area 732 can include an area on a bridge 730 over a river or waterway 734 and an area of the roads 76 in the vicinity of the bridge 730. While the work vehicle 100 is traveling in the bridge area 732, it is desirable that the state in the vicinity of the wheels of the work vehicle 100, particularly the state in the vicinity of the front wheels, be detectable. While the work vehicle 100 is traveling in the bridge area 732, the pattern of the lateral search regions 820L, 820R shown in FIG. 20 is set, so that a search improved or optimized for the bridge area 732 can be conducted.

Figure 22:
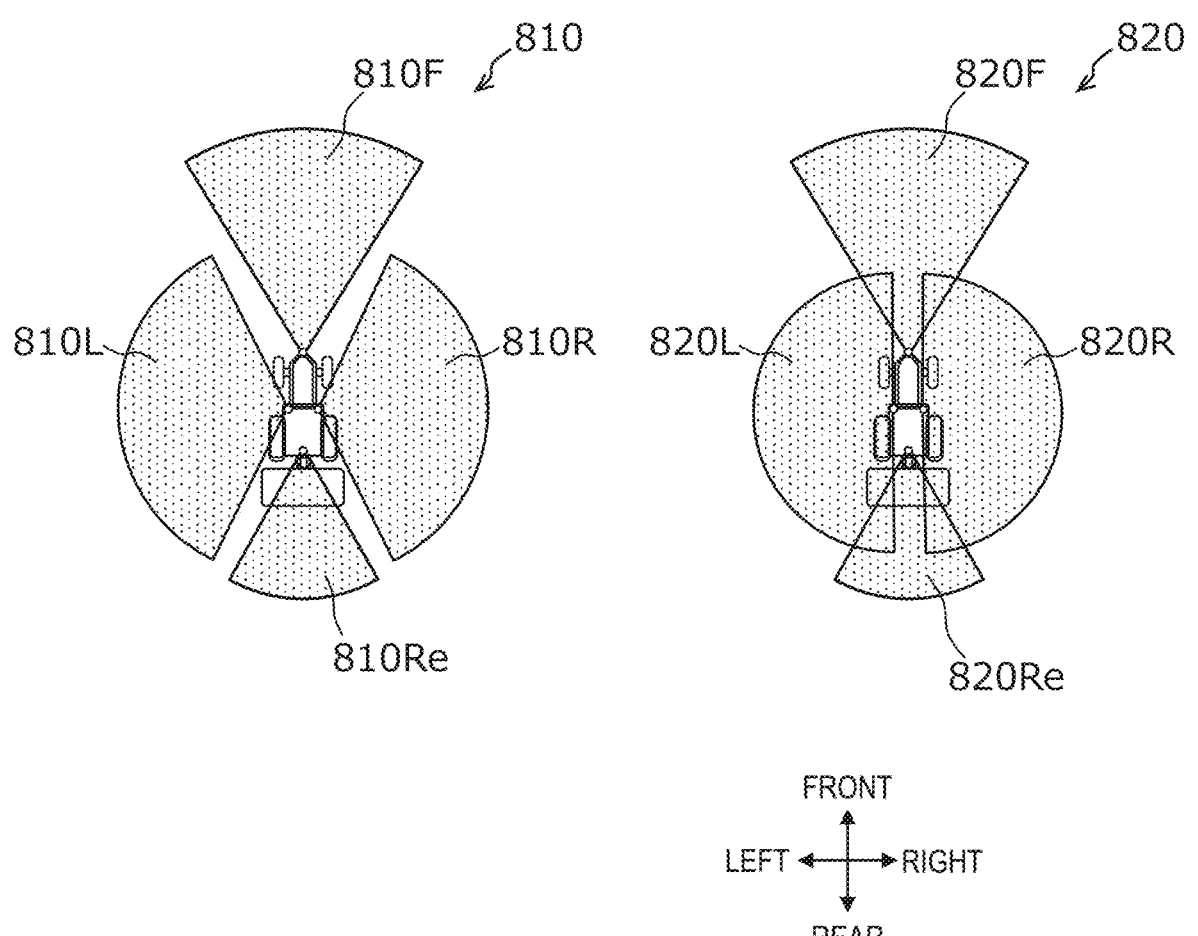
FIG. 22 shows still another example of the first search region and the second search region.

FIG. 22 shows still another example of the first search region 810 and the second search region 820. In the example shown in FIG. 20, the lateral search regions 810L, 810R, 820L, 820R have a generally rectangular shape but may have a different shape. For example, as shown in FIG. 22, the lateral search regions 810L, 810R, 820L, 820R may be generally in the shape of a fan.

FIG. 21 further shows a barn entrance area 742 where the pattern of the search regions is changed. At the entrance 741 of the barn 740 for storing the work vehicle 100, it is desirable that the state on the lateral sides of the work vehicle 100 be detectable in an early phase. While the work vehicle 100 is traveling in the entrance area 742, the search regions 820 shown in FIG. 13, FIG. 18 or FIG. 19 are set. The lateral search regions 820L and 820R are set to have a greater length in the longitudinal direction in the case where the work vehicle 100 is traveling in the entrance area 742 than in the case where the work vehicle 100 is traveling in an area other than the entrance area 742, so that the state on the lateral sides of the work vehicle 100 can be detectable in an early phase.

Figure 23:
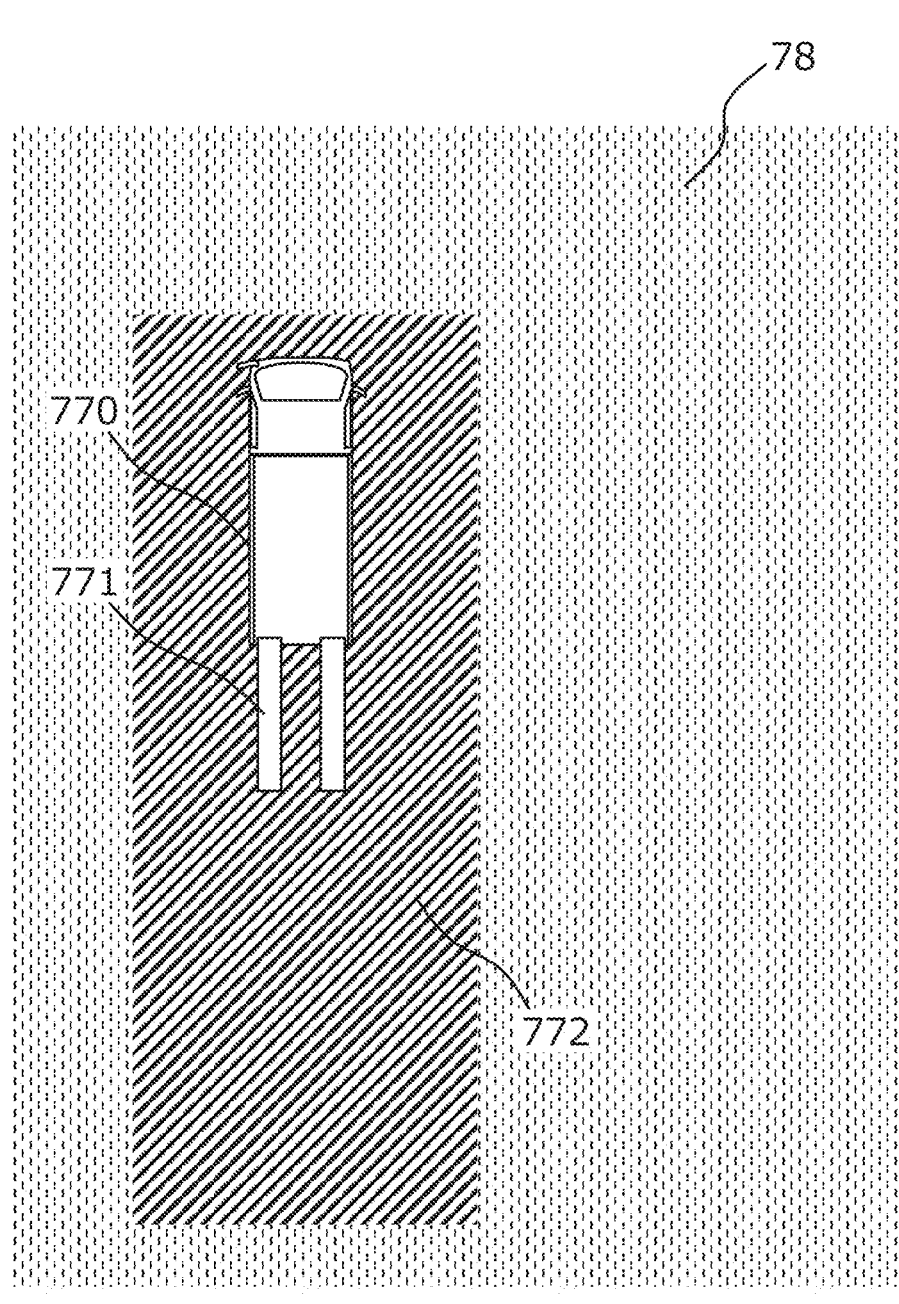
FIG. 23 shows still another example of the area in which the pattern of the search regions is changed.

FIG. 23 shows still another example of the area in which the pattern of the search regions is changed. In the example shown in FIG. 23, the predetermined area in which the pattern of the search regions is changed is an area 772 of the farmwork site 78 in which the work vehicle 100 is to be loaded onto a carrier 770. The area 772 may be located on the roads 76.

The loading of the work vehicle 100 onto the carrier 770 is realized by controlling the work vehicle 100 to travel along ladder rails 771 attached to the carrier 770. The loading area 772 includes an area in the vicinity of the carrier 770 and the ladder rails 771. During the loading of the work vehicle 100, it is desirable that the state in the vicinity of the wheels of the work vehicle 100, particularly the state in the vicinity of the front wheels, be detectable. While the work vehicle 100 is traveling in the bridge area 732, the pattern of the lateral search regions 820L, 820R shown in FIG. 20 or FIG. 22 is set, so that a search improved or optimized for the loading can be conducted.

Figure 24:
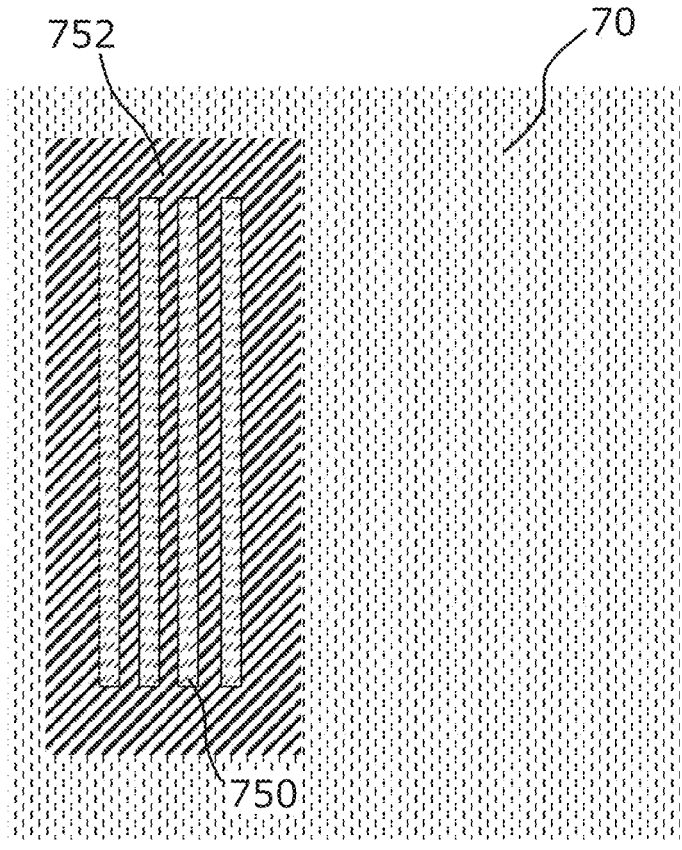
FIG. 24 shows still another example of the area in which the pattern of the search regions is changed.
Figure 25:
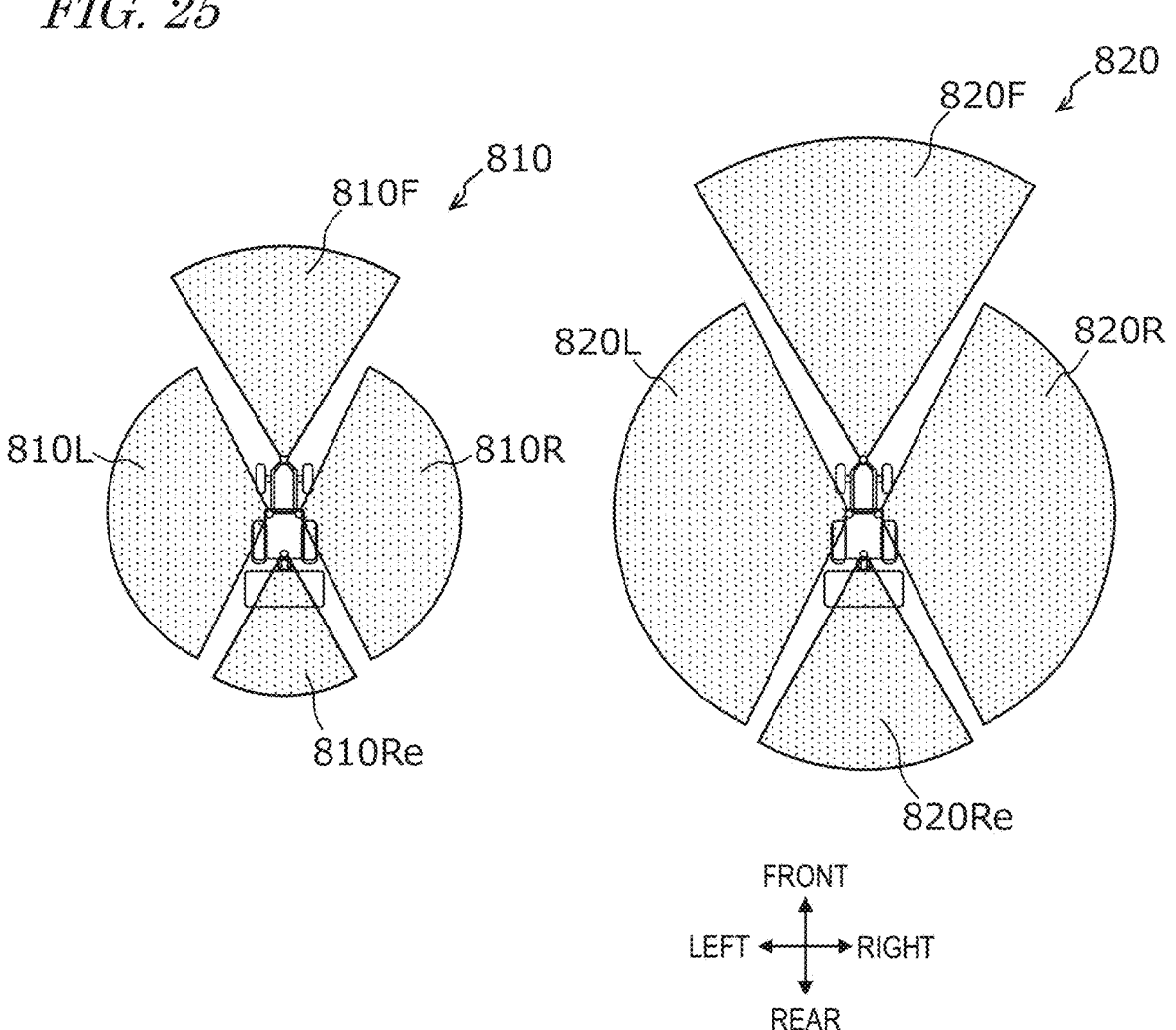
FIG. 25 shows still another example of the first search region and the second search region.

FIG. 24 shows still another example of the area in which the pattern of the search regions is changed. FIG. 25 shows still another example of the first search region 810 and the second search region 820. In the example shown in FIG. 24, the predetermined area in which the pattern of the search regions is changed is a ridge area 752 that is a portion of the field 70 in which ridges 750 are provided. In the ridge area 752, it is desirable that the state of a larger region around the work vehicle 100 be detectable.

In the example shown in FIG. 25, the search regions 820 have a greater size than the search regions 810. In the ridge area 752, the search regions 820 shown in FIG. 25 are set. The search regions 820 are set to have a greater size in the case where the work vehicle 100 is traveling in the ridge area 752 than in the case where the work vehicle 100 is traveling in a portion of the field 70 other than the ridge area 752, so that the state of a larger region around the work vehicle 100 can be detectable.

Figure 26:
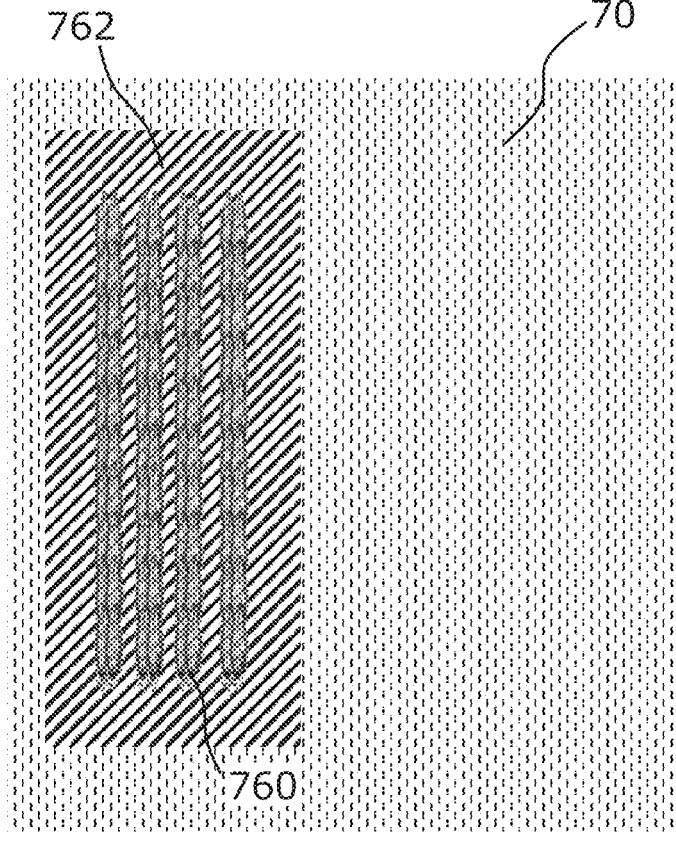
FIG. 26 shows still another example of the area in which the pattern of the search regions is changed.

FIG. 26 shows still another example of the area in which the pattern of the search regions is changed. In the example shown in FIG. 26, the predetermined area in which the pattern of the search regions is changed is a crop row area 762 that is a portion of the field 70 in which crop rows 760 are located. In the crop row area 762, it is desirable that the state of a larger region around the work vehicle 100 be detectable. In the crop row area 762, the search regions 820 shown in FIG. 25 are set. The search regions 820 are set to have a greater size in the case where the work vehicle 100 is traveling in the crop row area 762 than in the case where the work vehicle 100 is traveling in a portion of the field 70 other than the crop row area 762, so that the state of a larger region around the work vehicle 100 can be detectable.

Next, the process of setting search regions in accordance with the implement 300 connected with the work vehicle 100 is described.

Figure 27:
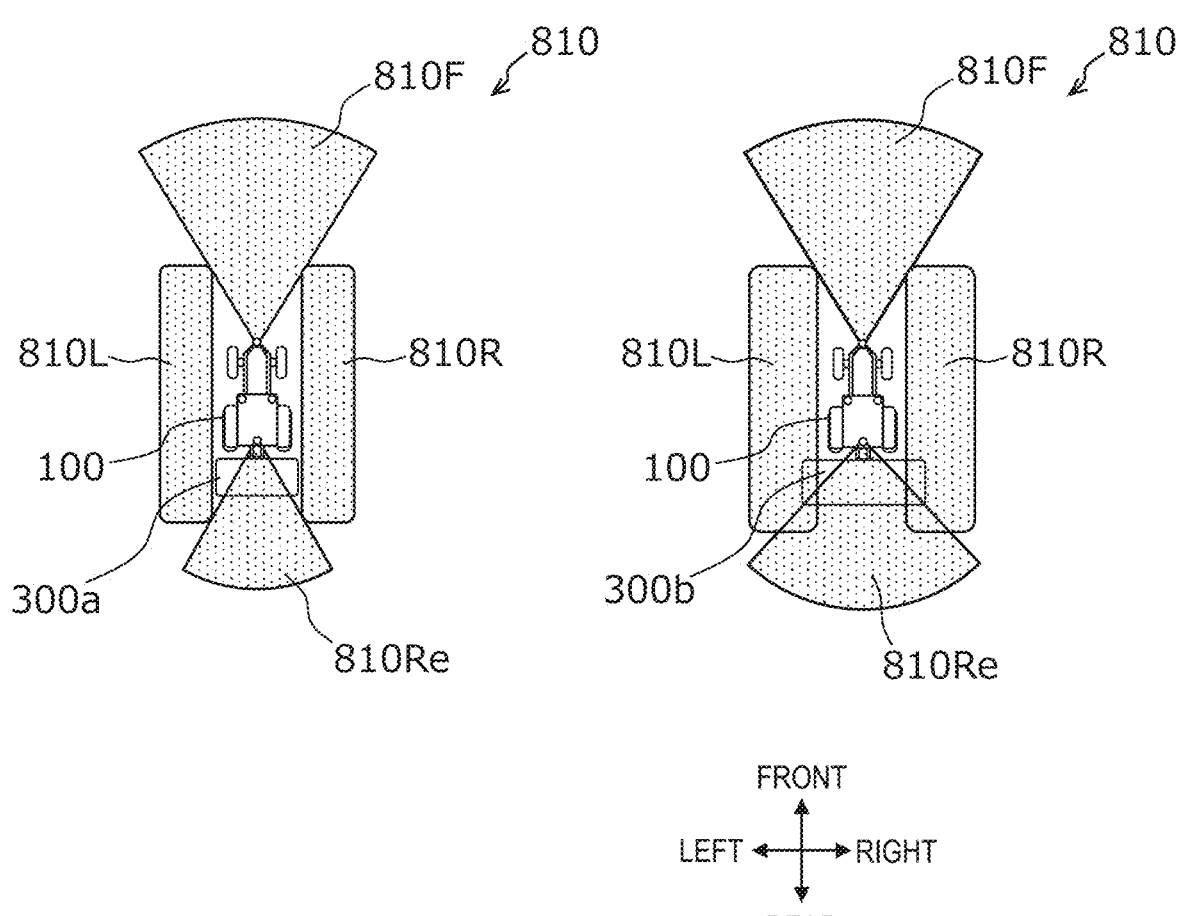
FIG. 27 shows an example of the search regions that are set in accordance with the size of an implement connected with a work vehicle.

FIG. 27 shows an example of the search regions 810 that are set in accordance with the size of the implement 300 connected with the work vehicle 100. A plurality of types of implements 300 having different sizes are connectable with the work vehicle 100. The processor 161 changes the pattern of the search regions 810 in accordance with the size of the implement 300 connected with the work vehicle 100.

The storage 170 (FIG. 3) stores information about the size of a plurality of types of implements 300 in advance. The processor 161 communicates with the implement 300 and acquires unique information that can identify the model of the implement 300. The unique information includes, for example, the model number of the implement 300. The processor 161 can determine the size of the implement 300 connected with the work vehicle 100 by retrieving from the storage 170 the information about the size corresponding to the unique information of the implement 300. Note that the information about the size of the implement 300 may be entered into the work vehicle 100 by a worker.

The size of the implement 300*b* connected with the work vehicle 100 on the right portion of FIG. 27 is greater than that of the implement 300*a* connected with the work vehicle 100 on the left portion of FIG. 27. For example, the implement 300*b* has a greater size in at least one of the longitudinal and transverse directions than the implement 300*a*. In the example shown in FIG. 27, the lateral search regions 810L and 810R shown in the right portion have a greater size in the transverse direction than the lateral search regions 810L and 810R shown in the left portion. The rear search region 810Re shown in the right portion has a greater size in the longitudinal and transverse directions than the rear search region 810Re shown in the left portion. By changing the pattern of the search regions 810 in accordance with the size of the implement 300, a search improved or optimized for the size of the implement 300 can be conducted.

Figure 28:
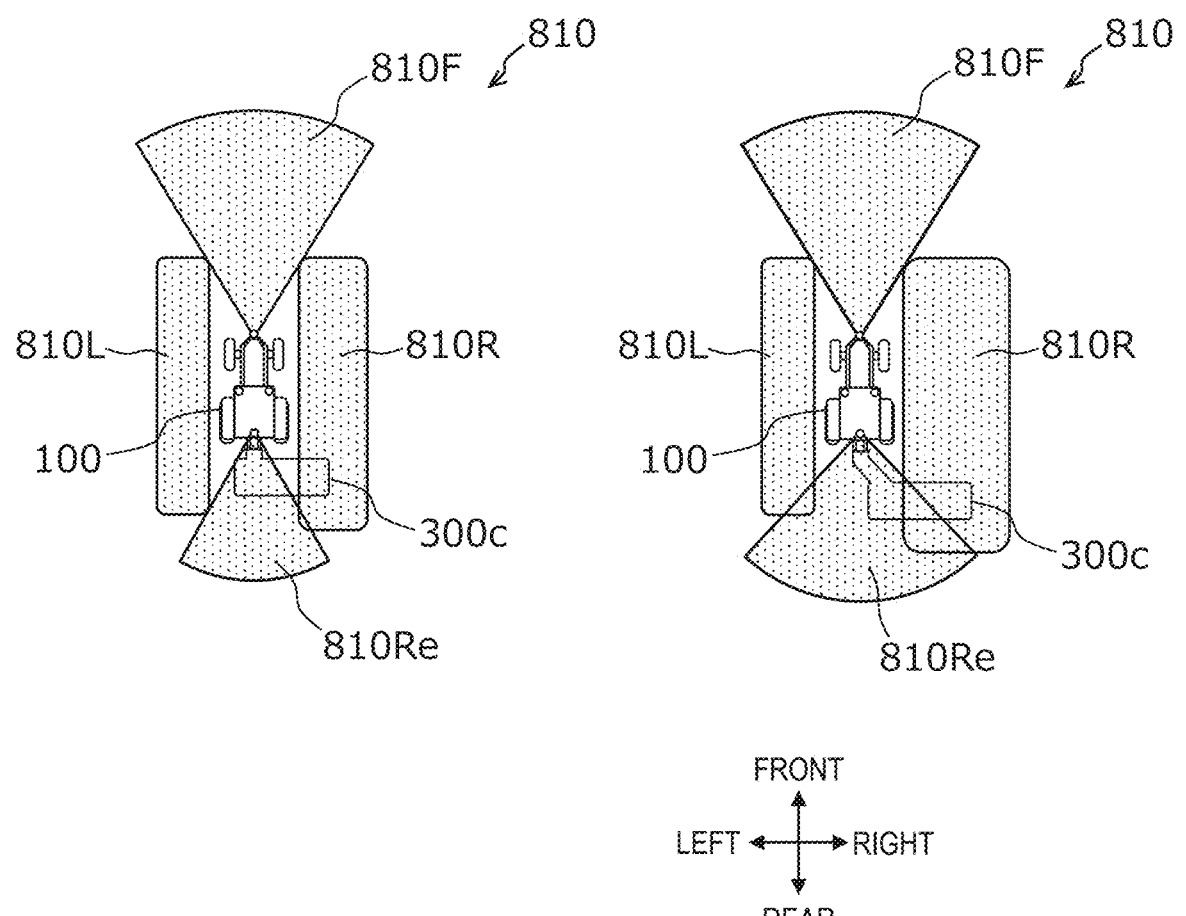
FIG. 28 shows an example of the search regions that are set in accordance with the positional relationship between a work vehicle and an implement.

Next, the process of changing the pattern of the search regions 810 in accordance with the change in the positional relationship between the work vehicle 100 and the implement 300 is described. FIG. 28 shows an example of the search regions 810 that are set in accordance with the positional relationship between the work vehicle 100 and the implement 300.

The implement 300*c* shown in FIG. 28 is an implement whose positional relationship with the work vehicle 100 is changeable. Such an implement can also be referred to as offset-type implement. The processor 161 can be configured or programmed to determine the position of the implement 300*c* based on, for example, control signals output from the work vehicle 100 to the implement 300*c*.

In the example shown in FIG. 28, as compared with the implement 300*c* shown in the left portion, the implement 300*c* shown in the right portion is at a position extended to the right side relative to the work vehicle 100. In the example shown in FIG. 28, the lateral search region 810R shown in the right portion has a greater size in the longitudinal and transverse directions than the lateral search region 810R shown in the left portion. The rear search region 810Re shown in the right portion has a greater size in the longitudinal and transverse directions than the rear search region 810Re shown in the left portion. By changing the pattern of the search regions 810 in accordance with the change in the positional relationship between the work vehicle 100 and the implement 300, a search improved or optimized for the position of the implement 300 can be conducted.

As compared with the implement 300*a* shown in the left portion of FIG. 27, the implement 300*c* shown in the left portion of FIG. 28 is at a position extended to the right side relative to the work vehicle 100. By setting the lateral search region 810R shown in the left portion of FIG. 28 to have a greater size in the longitudinal and transverse directions than the lateral search region 810R shown in the left portion of FIG. 27, a search improved or optimized for the position of the implement 300 can be conducted.

In the above description of the example embodiment, the pattern of the search regions is changed in the process of detecting objects using the sensing data output by the LiDAR sensors, although the pattern of the search regions may be changed in the process of detecting objects using sensing data output by sensors other than the LiDAR sensors (e.g., cameras, ultrasonic sonars, etc.). For example, the pattern of the search regions may be changed by changing a portion of image data captured by a camera which is for use in detection of objects. Alternatively, for example, the pattern of the search regions may be changed by changing the power of an ultrasonic sonar or changing the angular range for sensing.

The sensing system 10 of the present example embodiment can be mounted on an agricultural machine lacking such functions, as an add-on. Such a system may be manufactured and marketed independently from the agricultural machine. A computer program for use in such a system may also be manufactured and marketed independently from the agricultural machine. The computer program may be provided in a form stored in a non-transitory computer-readable storage medium, for example. The computer program may also be provided through downloading via telecommunication lines (e.g., the Internet).

Some or all of the processes that are to be performed by the processor 161 in the sensing system 10 may be performed by another device. Such another device may be at least one of the processor 660 of the management device 600, the processor 460 of the terminal unit 400, and the operational terminal 200. In this case, such another device and the processor 161 function as a processor of the sensing system 10, or such another device functions as a processor of the sensing system 10. For example, when some of the processes that are to be performed by the processor 161 is performed by the processor 660 of the management device 600, the processor 161 and the processor 660 function as a processor of the sensing system 10.

Some or all of the processes that are to be performed by the processor 161 may be performed by the controller 180. In this case, the controller 180 and the processor 161 may be configured or programmed to function as a processor of the sensing system 10, or the controller 180 may be configured or programmed to function as a processor of the sensing system 10.

As described above, the present disclosure includes an agricultural machine and a sensing system and sensing method for an agricultural machine, which will be described in the following paragraphs.

A sensing system 10 according to an example embodiment of the present disclosure is a sensing system 10 for a mobile agricultural machine 100, including one or more sensors 140 provided in the agricultural machine 100 to sense an environment around the agricultural machine 100 to output sensing data, and a processor 161 configured or programmed to detect an object in a search region 810, 820 around the agricultural machine 100 based on the sensing data and to change a pattern of the search region 810, 820 for the detection of the object in accordance with an area in which the agricultural machine 100 is located.

Due to this feature, a search can be conducted which is improved or optimized for the area in which the agricultural machine 100 is located.

In one example embodiment, the processor 161 may be configured or programmed to cause the pattern of the search region 810, 820 to be different between a case where the agricultural machine 100 is located in a first area of a field 70 and a case where the agricultural machine 100 is located in a second area of the field 70, the second area being closer to an outer boundary of the field 70 than the first area.

Due to this feature, a search can be conducted which is improved or optimized for each of a case where the agricultural machine 100 is located in an area near the outer boundary of the field 70 and a case where the agricultural machine 100 is located in an area distant from the outer boundary of the field 70.

In one example embodiment, the second area may include an embankment edge 712. Due to this feature, a search can be conducted over a range that is improved or optimized for traveling at the embankment edge 712.

In one example embodiment, the search region 810, 820 may include a lateral search region 810L, 810R, 820L, 820R including a region on a lateral side of the agricultural machine 100, and the processor 161 may be configured or programmed to cause the lateral search region to have a greater length in a longitudinal direction in the case where the agricultural machine 100 is located in the second area than in the case where the agricultural machine 100 is located in the first area.

Due to this feature, the state on the lateral side of the agricultural machine 100 can be detected in an early phase.

In one example embodiment, the processor 161 may be configured or programmed to cause the pattern of the search region 810, 820 to be different between a case where the agricultural machine 100 is located on a bridge 730 and a case where the agricultural machine 100 is located on a predetermined road 76 other than the bridge 730.

Due to this feature, a search can be conducted which is improved or optimized for each of the case where the agricultural machine 100 is located on the bridge 730 and the case where the agricultural machine 100 is located on a predetermined road 76 other than the bridge 730.

In one example embodiment, the agricultural machine 100 includes a work vehicle 100 with a front wheel 104F, and the processor 161 may be configured or programmed to set the search region 820 to include a region closer to an outer edge of a front portion of the front wheel 104F in the case where the agricultural machine 100 is located on the bridge 730 than in the case where the agricultural machine 100 is located on the predetermined road 76.

Due to this feature, a search can be conducted over a range improved or optimized for traveling on the bridge 730.

In one example embodiment, the processor 161 may be configured or programmed to cause the pattern of the search region 810, 820 to be different between a case where the agricultural machine 100 is located on a road 76 which is adjacent to a water path 720 and a case where the agricultural machine 100 is located on a road 76 which is not adjacent to a water path 720.

Due to this feature, a search can be conducted which is improved or optimized for each of the case where the agricultural machine 100 is located on a road 76 which is adjacent to a water path 720 and the case where the agricultural machine 100 is located on a road 76 which is not adjacent to a water path 720.

In one example embodiment, the search region 810, 820 may include a lateral search region 810L, 810R, 820L, 820R including a region on a lateral side of the agricultural machine 100, and the processor 161 may be configured or programmed to cause the lateral search region to have a greater length in a longitudinal direction in the case where the agricultural machine 100 is located on the road 76 which is adjacent to the water path 720 than in the case where the agricultural machine 100 is located on the road 76 which is not adjacent to the water path 720.

Due to this feature, a search can be conducted over a range improved or optimized for traveling on a road 76 which is adjacent to the water path 720.

In one example embodiment, the processor 161 may be configured or programmed to cause the pattern of the search region 810, 820 to be different between a case where the agricultural machine 100 is located at an entrance 741 of a barn 740 and a case where the agricultural machine 100 is located in a third area other than the entrance 741 of the barn 740.

Due to this feature, a search can be conducted which is improved or optimized for each of a case where the agricultural machine 100 is located at an entrance 741 of a barn 740 and a case where the agricultural machine 100 is not located at the entrance 741 of the barn 740.

In one example embodiment, the search region 810, 820 may include a lateral search region 810L, 810R, 820L, 820R including a region on a lateral side of the agricultural machine 100, and the processor 161 may be configured or programmed to cause the lateral search region to have a greater length in a longitudinal direction in the case where the agricultural machine 100 is located at the entrance 741 of the barn 740 than in the case where the agricultural machine 100 is located in the third area.

Due to this feature, a search can be conducted over a range improved or optimized for traveling at the entrance 741 of the barn 740.

In one example embodiment, the processor 161 may be configured or programmed to cause the pattern of the search region 810, 820 to be different between a case where the agricultural machine 100 is located in a fourth area of the field 70 and a case where the agricultural machine 100 is located in a fifth area of the field 70, the fifth area being closer to a ridge 750 or crop-planting area 760 of the field 70 than the fourth area.

Due to this feature, a search can be conducted which is improved or optimized for each of a case where the agricultural machine 100 is located in an area close to a ridge 750 or crop-planting area 760 of the field 70 and a case where the agricultural machine 100 is not located in that area.

In one example embodiment, the processor 161 may be configured or programmed to cause the pattern of the search region 810, 820 to be different between a case where the agricultural machine 100 is located at a position where the agricultural machine 100 is to be loaded onto a carrier 770 and a case where the agricultural machine 100 is not located at the position where the agricultural machine 100 is to be loaded onto the carrier 770.

Due to this feature, a search can be conducted which is improved or optimized for each of a case where the agricultural machine 100 is located at a position where the agricultural machine 100 is to be loaded onto a carrier 770 and a case where the agricultural machine 100 is not located at that position.

In one example embodiment, the agricultural machine 100 may include a work vehicle 100 and an implement 300 connected with the work vehicle 100, and the processor 161 may be configured or programmed to change the pattern of the search region 810, 820 in accordance with the implement 300 connected with the work vehicle 100.

Due to this feature, a search can be conducted which is improved or optimized for the implement 300 connected with the work vehicle 100.

In one example embodiment, a plurality of types of implements 300 having different sizes may be connectable with the work vehicle 100, and the processor 161 may be configured or programmed to change the pattern of the search region 810, 820 in accordance with a size of the implement 300 connected with the work vehicle 100.

Due to this feature, a search can be conducted which is improved or optimized for the size of the implement 300 connected with the work vehicle 100.

In one example embodiment, a positional relationship between the work vehicle 100 and the implement 300 connected with the work vehicle 100 is changeable, and the processor 161 may be configured or programmed to change the pattern of the search region 810, 820 in accordance with a change in the positional relationship between the work vehicle 100 and the implement 300.

Due to this feature, a search can be conducted in accordance with the change in the positional relationship between the work vehicle 100 and the implement 300.

In one example embodiment, the sensing system 10 further includes a position sensor 110 to detect a position of the agricultural machine 100 to output position data and a storage 170 to store map data concerning an area in which the agricultural machine 100 travels, wherein the processor 161 may be configured or programmed to determine the area in which the agricultural machine 100 is located based on the position data and the map data.

Using the position sensor 110 enables determination of the area in which the agricultural machine 100 is located.

In one example embodiment, the agricultural machine 100 may include the above-described sensing system 10. In this case, a search can be conducted which is improved or optimized for the area in which the agricultural machine 100 is located.

In one example embodiment, the agricultural machine 100 may further include a travel device 240 to enable the agricultural machine 100 to travel and a controller 160 configured or programmed to control an operation of the travel device 240 such that the agricultural machine 100 performs self-driving. Due to this feature, a search can be conducted which is improved or optimized for the area in which the self-traveling agricultural machine 100 is located.

A sensing method according to an example embodiment of the present disclosure is a sensing method for a mobile agricultural machine 100, including sensing an environment around the agricultural machine 100 using one or more sensors 140 to output sensing data, detecting an object in a search region 810, 820 around the agricultural machine 100 based on the sensing data, and changing a pattern of the search region 810, 820 for the detection of the object in accordance with an area in which the agricultural machine 100 is located.

Due to this feature, a search can be conducted which is improved or optimized for the area in which the agricultural machine 100 is located.

The techniques and example embodiments according to the present disclosure are particularly useful in the fields of agricultural machines, such as tractors, harvesters, rice transplanters, vehicles for crop management, vegetable transplanters, mowers, seeders, spreaders, or agricultural robots, for example.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A sensing system for a mobile agricultural machine, the sensing system comprising:
   one or more sensors to sense an environment around the agricultural machine to output sensing data; and a processor configured or programmed to detect an object in a search region around the agricultural machine based on the sensing data and change a pattern of the search region for the detection of the object in accordance with an area in which the agricultural machine is located; wherein
   the processor is configured or programmed to cause the pattern of the search region to be different between a case where the agricultural machine is located in a first area of a field and a case where the agricultural machine is located in a second area of the field, the second area being closer to an outer boundary of the field than the first area;
   the search region includes a lateral search region including a region on a lateral side of the agricultural machine; and
   the processor is configured or programmed to cause the lateral search region to have a greater length in a longitudinal direction in the case where the agricultural machine is located in the second area than in the case where the agricultural machine is located in the first area.

2. The sensing system of claim 1, wherein the second area includes an embankment edge.

3. The sensing system of claim 1, wherein the processor is configured or programmed to cause the pattern of the search region to be different between a case where the agricultural machine is located on a bridge and a case where the agricultural machine is located on a predetermined road other than the bridge.

4. A sensing system for a mobile agricultural machine, the sensing system comprising:
   one or more sensors to sense an environment around the agricultural machine to output sensing data; and
   a processor configured or programmed to detect an object in a search region around the agricultural machine based on the sensing data and change a pattern of the search region for the detection of the object in accordance with an area in which the agricultural machine is located; wherein
   the processor is configured or programmed to cause the pattern of the search region to be different between a case where the agricultural machine is located on a bridge and a case where the agricultural machine is located on a predetermined road other than the bridge;
   the agricultural machine includes a work vehicle with a front wheel; and
   the processor is configured or programmed to set the search region to include a region closer to an outer edge of a front portion of the front wheel in the case where the agricultural machine is located on the bridge than in the case where the agricultural machine is located on the predetermined road.

5. The sensing system of claim 1, wherein the processor is configured or programmed to cause the pattern of the search region to be different between a case where the agricultural machine is located on a road which is adjacent to a water path and a case where the agricultural machine is located on a road which is not adjacent to a water path.

6. A sensing system for a mobile agricultural machine, the sensing system comprising:
   one or more sensors to sense an environment around the agricultural machine to output sensing data; and
   a processor configured or programmed to detect an object in a search region around the agricultural machine based on the sensing data and change a pattern of the search region for the detection of the object in accordance with an area in which the agricultural machine is located; wherein the processor is configured or programmed to cause the pattern of the search region to be different between a case where the agricultural machine is located on a road which is adjacent to a water path and a case where the agricultural machine is located on a road which is not adjacent to a water path;

the search region includes a lateral search region including a region on a lateral side of the agricultural machine; and the processor is configured or programmed to cause the lateral search region to have a greater length in a longitudinal direction in the case where the agricultural machine is located on the road which is adjacent to the water path than in the case where the agricultural machine is located on the road which is not adjacent to the water path.

7. The sensing system of claim 1, wherein the processor is configured or programmed to cause the pattern of the search region to be different between a case where the agricultural machine is located at an entrance of a barn and a case where the agricultural machine is located in a third area other than the entrance of the barn.

8. A sensing system for a mobile agricultural machine, the sensing system comprising:

one or more sensors to sense an environment around the agricultural machine to output sensing data; and a processor configured or programmed to detect an object in a search region around the agricultural machine based on the sensing data and change a pattern of the search region for the detection of the object in accordance with an area in which the agricultural machine is located; wherein the processor is configured or programmed to cause the pattern of the search region to be different between a case where the agricultural machine is located at an entrance of a barn and a case where the agricultural machine is located in a third area other than the entrance of the barn;

the search region includes a lateral search region including a region on a lateral side of the agricultural machine; and the processor is configured or programmed to cause the lateral search region to have a greater length in a longitudinal direction in the case where the agricultural machine is located at the entrance of the barn than in the case where the agricultural machine is located in the third area.

9. The sensing system of claim 1, wherein the processor is configured or programmed to cause the pattern of the search region to be different between a case where the agricultural machine is located in a fourth area of the field and a case where the agricultural machine is located in a fifth area of the field, the fifth area being closer to a ridge or crop-planting area of the field than the fourth area.

10. The sensing system of claim 1, wherein the processor is configured or programmed to cause the pattern of the search region to be different between a case where the agricultural machine is located at a position where the agricultural machine is to be loaded onto a carrier and a case where the agricultural machine is not located at the position where the agricultural machine is to be loaded onto the carrier.

11. The sensing system of claim 1, wherein the agricultural machine includes a work vehicle and an implement connected with the work vehicle; and the processor is configured or programmed to change the pattern of the search region in accordance with the implement connected with the work vehicle.

12. The sensing system of claim 11, wherein a plurality of types of implements with different sizes are connectable with the work vehicle; and the processor is configured or programmed to change the pattern of the search region in accordance with a size of the implement connected with the work vehicle.

13. The sensing system of claim 11, wherein a positional relationship between the work vehicle and the implement connected with the work vehicle is changeable; and the processor is configured or programmed to change the pattern of the search region in accordance with a change in the positional relationship between the work vehicle and the implement.

14. The sensing system of claim 1, further comprising:

a position sensor to detect a position of the agricultural machine to output position data; and a storage to store map data concerning an area in which the agricultural machine travels; wherein the processor is configured or programmed to determine the area in which the agricultural machine is located based on the position data and the map data.

15. An agricultural machine comprising the sensing system of claim 1.

16. The agricultural machine of claim 15, further comprising:

a travel device to enable the agricultural machine to travel; and a controller configured or programmed to control an operation of the travel device such that the agricultural machine performs self-driving.

17. A sensing method for a mobile agricultural machine, the sensing method comprising:

sensing an environment around the agricultural machine using one or more sensors to output sensing data;

detecting an object in a search region around the agricultural machine based on the sensing data;

changing a pattern of the search region for the detection of the object in accordance with an area in which the agricultural machine is located; and causing the pattern of the search region to be different between a case where the agricultural machine is located in a first area of a field and a case where the agricultural machine is located in a second area of the field, the second area being closer to an outer boundary of the field than the first area; wherein the search region includes a lateral search region including a region on a lateral side of the agricultural machine; and the sensing method further comprises causing the lateral search region to have a greater length in a longitudinal direction in the case where the agricultural machine is located in the second area than in the case where the agricultural machine is located in the first area.

* * * * *